(12) United States Patent
Schwarz et al.

(10) Patent No.: US 8,867,619 B2
(45) Date of Patent: Oct. 21, 2014

(54) APPARATUS AND METHOD FOR GENERATING A CODED VIDEO SEQUENCE BY USING AN INTERMEDIATE LAYER MOTION DATA PREDICTION

(75) Inventors: Heiko Schwarz, Berlin (DE); Detlev Marpe, Berlin (DE); Thomas Wiegand, Berlin (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 426 days.

(21) Appl. No.: 12/910,073

(22) Filed: Oct. 22, 2010

(65) Prior Publication Data

US 2011/0038421 A1  Feb. 17, 2011

Related U.S. Application Data

(62) Division of application No. 11/070,732, filed on Mar. 1, 2005.

(60) Provisional application No. 60/619,457, filed on Oct. 15, 2004.

(30) Foreign Application Priority Data

Dec. 13, 2004  (DE) .......................... 10 2004 059 993

(51) Int. Cl.
    *H04N 7/12*  (2006.01)
(52) U.S. Cl.
    USPC .................................................... 375/240.16
(58) Field of Classification Search
    USPC ....................................... 375/240.08, 240.16
    See application file for complete search history.

(56) References Cited

U.S. PATENT DOCUMENTS

| 5,422,672 | A | 6/1995 | Horst et al. |
| 5,973,739 | A | 10/1999 | Nilsson |
| 6,510,177 | B1 * | 1/2003 | De Bonet et al. ......... 375/240.16 |
| 7,227,894 | B2 * | 6/2007 | Lin et al. .................. 375/240.12 |
| 2002/0001411 | A1 | 1/2002 | Suzuki et al. |
| 2002/0009141 | A1 | 1/2002 | Yamaguchi et al. |

(Continued)

FOREIGN PATENT DOCUMENTS

| DE | 101 21 259 A1 | 7/2002 |
| EP | 0753970 A2 | 1/1997 |

(Continued)

OTHER PUBLICATIONS

"The Institute of Image Information and Television Engineers", Total multimedia Library MPEG, Ohmsha, Ltd., Jul. 20, 1998, p. 117-124; Japan, 117-124.

(Continued)

*Primary Examiner* — Sath V Perungavoor
*Assistant Examiner* — James Pontius
(74) *Attorney, Agent, or Firm* — Michael A. Glenn; Perkins Coie LLP

(57) ABSTRACT

In the scalable video coding in connection with motion compensation both in a base layer and in an enhancement layer, a prediction of the motion data of the enhancement layer is performed by using the motion data of the base layer to obtain a scalability concept, which provides, on the one hand, a maximum flexibility for the calculation of the motion data of the different layers and, on the other hand, allows a lower bit rate.

15 Claims, 14 Drawing Sheets motion data flag per macro block

| set | motion vector of enhancement layer derived from upsampled motion vector of the base layer |
|---|---|
| not set | no motion vector prediction from lower layer |

(56) References Cited

U.S. PATENT DOCUMENTS

| | | |
|---|---|---|
| 2002/0037047 A1 | 3/2002 | Van Der Shaar et al. |
| 2003/0044088 A1 | 3/2003 | Wright |
| 2003/0135631 A1 | 7/2003 | Li et al. |
| 2003/0165274 A1 | 9/2003 | Haskell et al. |
| 2005/0094726 A1 | 5/2005 | Park et al. |
| 2006/0072676 A1 | 4/2006 | Gomila |
| 2007/0211798 A1 | 9/2007 | Boyce et al. |
| 2007/0286283 A1 | 12/2007 | Yin et al. |
| 2008/0304567 A1 | 12/2008 | Boyce et al. |
| 2011/0103484 A1* | 5/2011 | Reibman et al. ......... 375/240.16 |

FOREIGN PATENT DOCUMENTS

| | | |
|---|---|---|
| GB | 2363274 | 12/2001 |
| JP | 06-070340 | 3/1994 |
| JP | 6070340 | 3/1994 |
| JP | H06-078282 | 3/1994 |
| JP | H10-136372 | 5/1998 |
| JP | 2001320715 | 11/2001 |
| WO | WO-2004073312 | 8/2004 |

OTHER PUBLICATIONS

The Japanese Office Action, and English Translation of the Japanese Office Action mailed Jul. 6, 2010 in parallel Japanese Patent Application No. 2007-536022, 13 pages.

Digitale Fernsehtechnik. Datenkompression und Uebertragugn fuer DVB, 1995.

Han, et al.; "Robust and Efficient Scalable Video Coding with Leaky Prediction"; 2002; IEEE ICIP.

ITU-T and ISO/IEC JTC1, "Advance Video Coding for Generic Audiovisual Services", ITU-T Recommendation H.264-ISO/IEC 14496-10 AVC, May 2003.

Lange, et al.; "Simple AVC-based codecs with Spatial Scalability"; Oct. 2004; Int'l Conference on Image Processing (ICIP); Singapore.

Lilienfield, et al.; "Scalable High-Definition Video Coding"; 1995; IEEE.

Marpe D., Schwarz H. and Wiegand T "SNR-Scalable Extension of H.264/AVC", 10th JVT-Meeting, Hawaii, Dec. 2003.

Marpe D., Schwarz H. and Wiegand T, "SNR-Scalable Extension of H.264/AVC", 9th JVT-Meeting, San Diego, Dec. 2003.

Marpe D., Schwarz H. and Wiegand T., "Context-based adaptive Binary Arithmethic Coding in the H.264/AVC Video Compression Standard", IEEE Transactions on Circuits and Systems for Video Technology, Sep. 2003.

MPEG Video Subgroup Chair, "Registered Responses to the Call of Proposals on Scalable Video Coding", ISO/IEC JTC1/SC29/WG11/M10569, Mar. 2004.

Ohm J.R., "Complexity and delay analysis of MCTF interframe wavelet structures"; ISO/IECJTC1/WG11 Doc.M8520, Jul. 2002.

Schaefer, R. et al.; "The Emerging H.264-AVC Standard"; Jan. 2003, EBU Technical Review, 12 pages.

Schäfer R., Wiegand T. and Schwarz H., "The Emerging H.264-AVC Standard" EBU Technical Review, Jan. 2003; 12 pages.

Schwarz H., Marpe D. and T. Wiegand, "Further Experiments for an MCTF extension of H.264" ITU-T VCEG-W06, Jul. 2004.

Schwarz H., Marpe D. and T. Wiegand, "Scalable Extension of H.264/AVC", M10569, Munich, Mar. 2004; Int'l Organization for Standardization, Munich.

Schwarz H., Marpe D. and T. Wiegand, "Scalable Extension of H.264/AVC", Mar. 2004, ISO/IEC JCT1/SC29/WG11/M10596/S03, 39 pages; Int'l Organization for Standardization, Munich.

Schwarz H., Marpe D. and T. Wiegand, "Subband Extension of H.264/AVC", ITU-T VCEG, Doc. VCEG-V04, Mar. 2004.

Schwarz H., Marpe D. and T. Wiegand, "SVC Core Experiment 2.1: Inter-layer prediction of motion and residual data"; M11043, Redmond, Jul. 2004.

Schwarz H.,Hinz T.,Marpe D. and T. Wiegand, "Technical description of the HHI porposal for SVC CE1", M11244, Palma de Mallorca, Oct. 2004.

Schwarz, et al.; "SVC Core Experiment 2.1: Inter-Layer Prediction of Motion and Residual Data." Jul. 2004; Fraunhofer Institute for Telecommuunications—Heinrich Hertz Institute.

Schwarz, Heiko, et al.; "SVC Core Experiment 2.1: Inter-layer prediction of motion and residual data"; Jul. 2004; ISO/IEC JTC 1/SC 29/WG 11/M11043, pp. 1-6.

Sweldens W. "A custom design constructions of biorthogonal wavelets", J. Appli. Comp. Harm. Anal., vol. 3(No. 2), pp. 186,200.;1996.

Sweldens W. and Daubechies I."Factoring wavelet transforms into lifting steps", J. Fourier Anal. Appli. vol. 4(No. 3), pp. 247-269, 1998.

Taubman D., "Successive refinement of video: fundamental issues, past efforts and new directions", Proc. of SPIE (VCIP'03), vol. 5150, pp. 649-663, 2003.

Van Der Schaar M. and Domanski M., "Description of Core Experiments in MPEG-21 Scalable Video Coding", ISO/IEC JTC1/SC297WG11/N6373, Mar. 2004.

Wiegand T., Sullivan G.J., Bjontegaard G. and Lothra A. "Overview of the H.264/AVC Video Coding Standard", IEEE Transactions on Circuits and Systems for Video Technology, Jul. 2003.

Wiegand, et al.; Draft ITU-T Recommendation and Final Draft International Standard of Joint Video Specification (ITU-T Rec. H.264: ISO/IEC 14496-10 AVC); May 2003; Joint Video Team of ISO/IEC MPEG & ITU-T VCEG, 8th Meeting: Geneea, Switzerland.

Woods, et al.; "A Resolution and Frame-rate Scalable Subband/Wavelet Video Coder"; Sep. 2001; IEEE Transactions on Circuits and Systems for Video Technology. vol. 11, No. 9.

Wu, et al.; "DCT-Prediction Based Progressive Fine Granularity Scalable Coding"; 2000, IEEE.

Sweldens W. "A custom design constructions of biorthogonal wavelets", J. Appli. Comp. Harm. Anal., vol. 3(No. 2), pp. 186,200.1996.

* cited by examiner

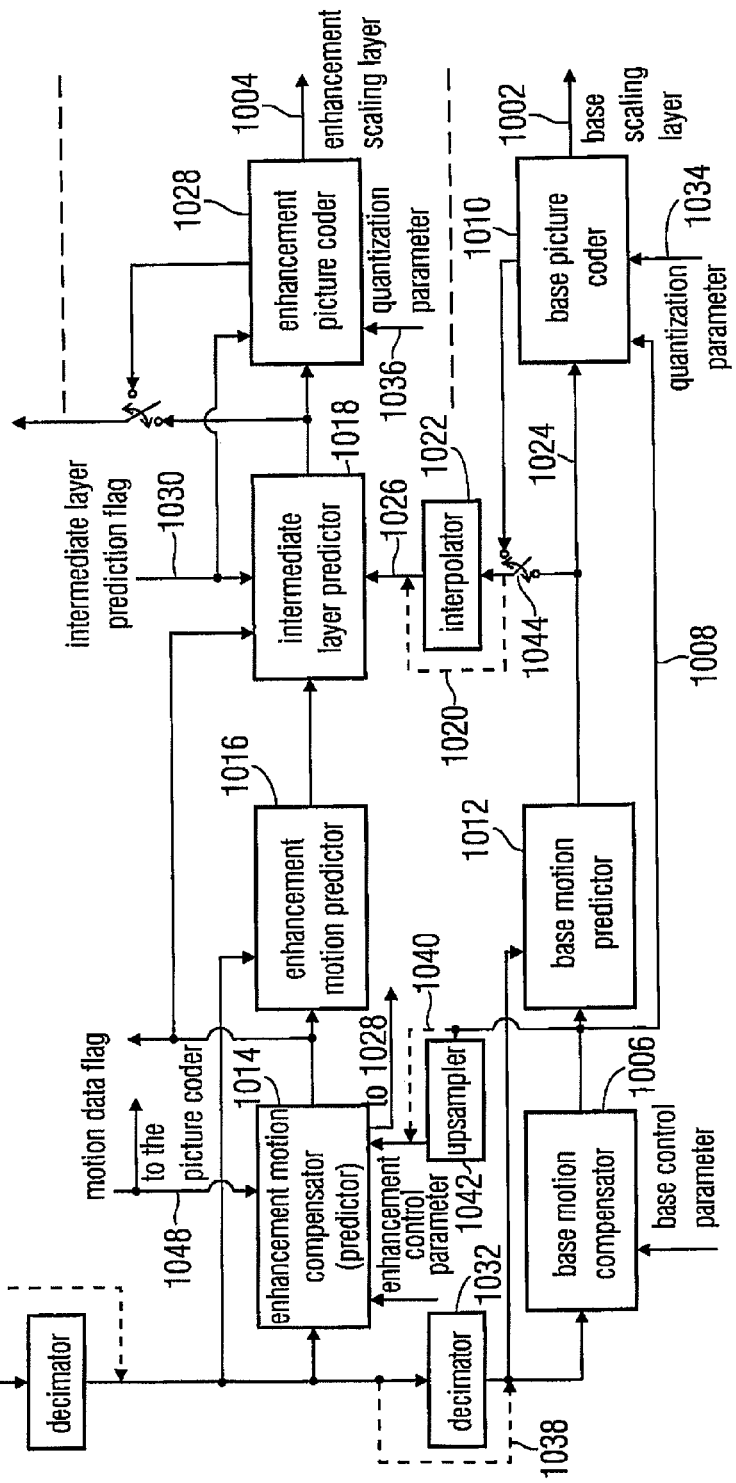
FIG. 1a (encoder)
if necessary, further enhancement layer(s)

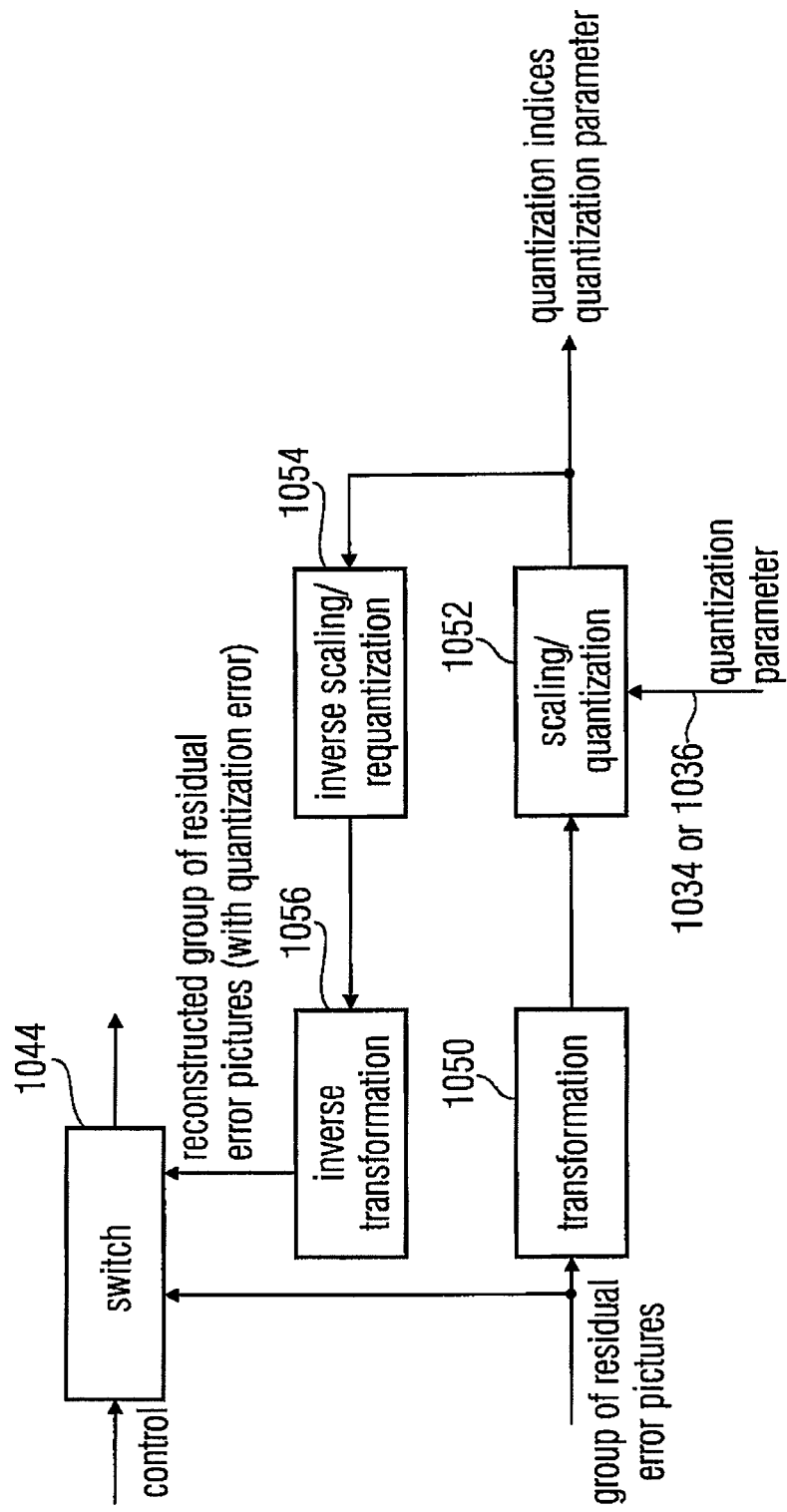
FIG. 1b (image coder)

intermediate layer prediction flag per macro block

| set | intermediate layer predictor is activated |
|---|---|
| not set | intermediate layer predictor is deactivated |

FIG. 1c motion data flag per macro block

| set | motion vector of enhancement layer derived from upsampled motion vector of the base layer |
|---|---|
| not set | no motion vector prediction from lower layer |

FIG. 1d

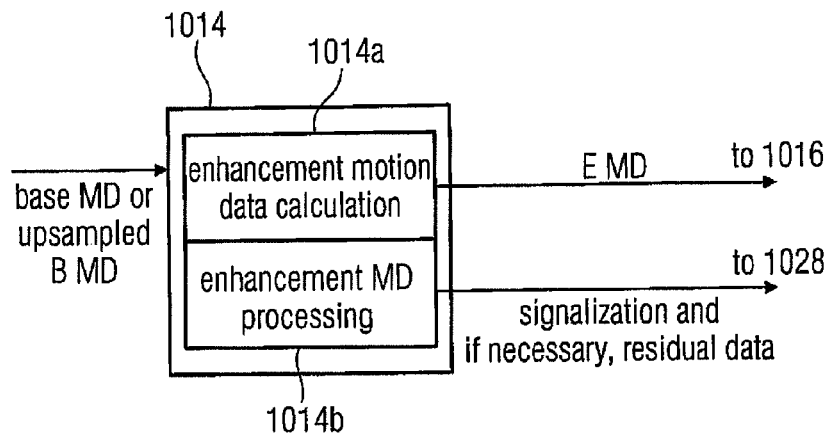
FIG. 1e (encoder side)
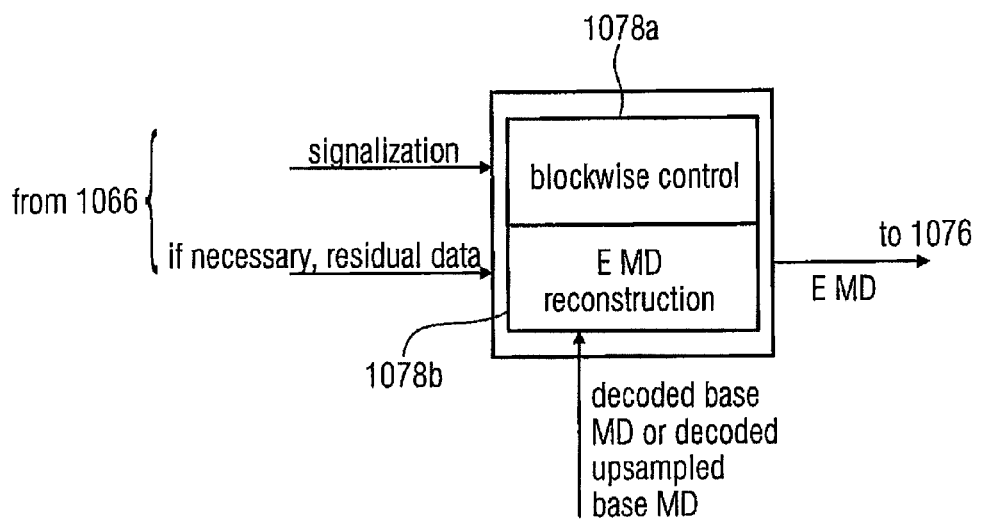
FIG. 1f (decoder side)

1. blockwise takeover of the (upsampled) base MD for the motion prediction
 → no transmission of residual enhancement motion data for the block
 → blockwise signalization through BL flag 1098

2. integration of the base motion vectors into enhancement motion data calculation
   according to m = [argmin (D(i,m) + $\lambda \cdot$R(i,m))]
           $\lambda$ = f (quantization parameter of the enhancement picture coder)

- when base motion vector fulfils search criteria
 → blockwise signalization through QRefFlag 1100
 → no transmission of residual enhancement motion data for the block

- integration of (slightly) altered base motion vectors
  into the motion vector search, if necessary
  additionally: blockwise transmission of the alteration of the
          base motion vector additionally to the QRefFlag 1100

3. (arbitrarily) determining the motion vectors and using for motion prediction
- integrating the base motion vector in the search for a favorable
  motion vector predictor for determining the motion vector difference
- if criterion is fulfilled, signalizing by MvPrdFlag 11006 and
  transmission of the difference

FIG. 1g

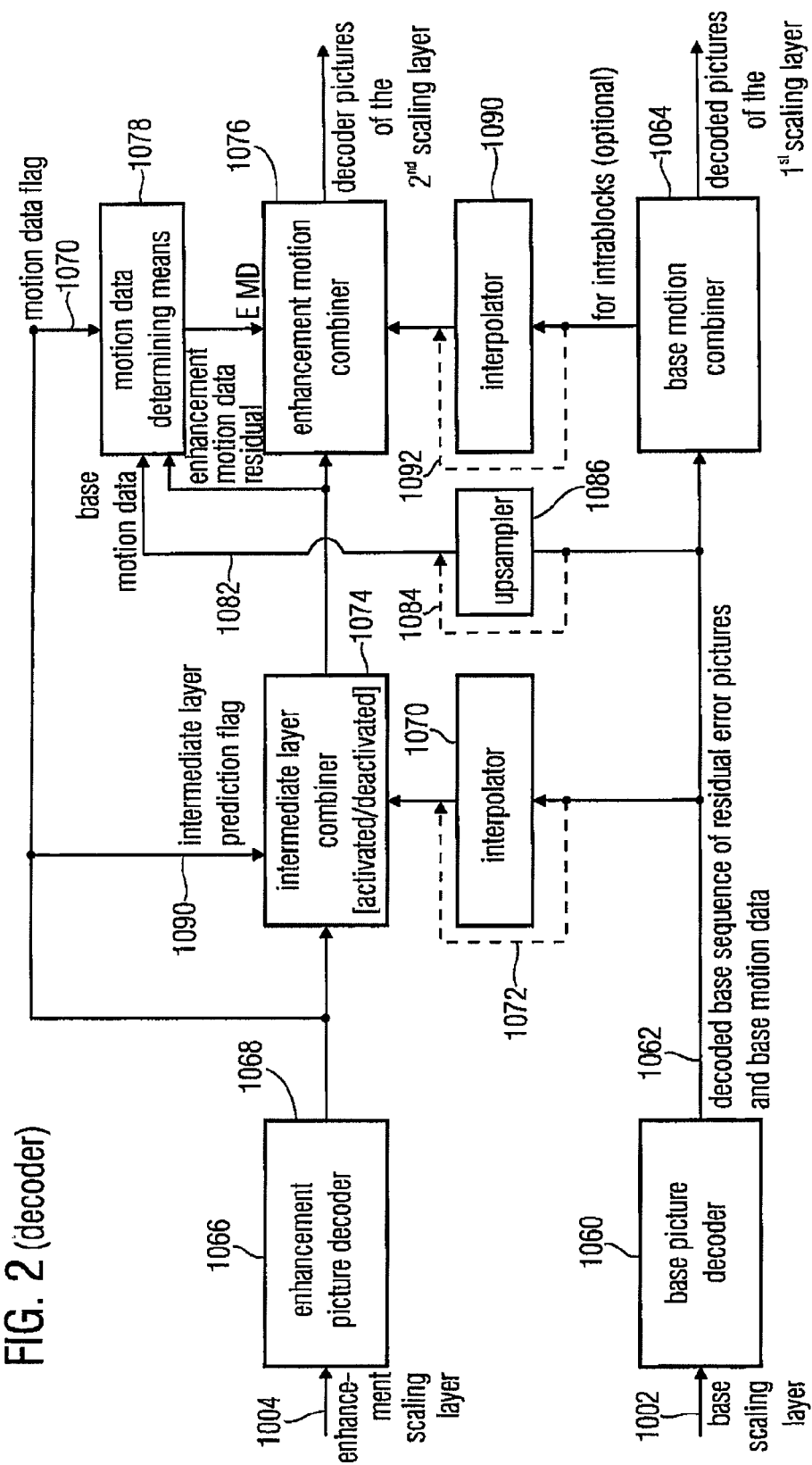

FIG. 5a $h[k] = s[2k+1] - P(s[2k+1])$  $\quad P(s[2k+1]) = \sum_i p_i s[2k+2i]$ $l[k] = s[2k] + U(s[2k])$  $\quad U(s[2k]) = \sum_i u_i h[k+i]$

FIG. 5b hair wavelet  $\quad\quad\quad\quad\quad\quad\quad\quad$ 5/3-Transformation $P_{hair}(s[x, 2k+1]) = s[x, 2k]$  $\quad P_{5/3}(s[x, 2k+1]) = \frac{1}{2}(s[x, 2k] + s[x, 2k+2])$ $U_{hair}(s[x, 2k]) = \frac{1}{2} h[x, k]$  $\quad U_{5/3}(s[x, 2k]) = \frac{1}{4}(h[x, k] + h[x, k-1])$

FIG. 5c $P_{hair}(s[x, 2k+1]) = s[x + m_{P0}, 2k - 2r_{P0}]$  $\quad$ m: motion vectors $U_{hair}(s[x, 2k]) = \frac{1}{2} h[x + m_{U0}, k + r_{U0}]$  $\quad$ r: reference indices $P_{5/3}(s[x, 2k+1]) = \frac{1}{2}(s[x + m_{P0}, 2k - 2r_{P0}] + s[x + m_{P1}, 2k + 2 + 2r_{P1}])$ $U_{5/3}(s[x, 2k]) = \frac{1}{4}(h[x + m_{U0}, k + r_{U0}] + h[x + m_{U1}, k - 1 - r_{U1}])$

FIG. 5d $P_{Intra}(s[x, 2k+1]) = 0$
$U_{Intra}(s[x, 2k]) = 0$

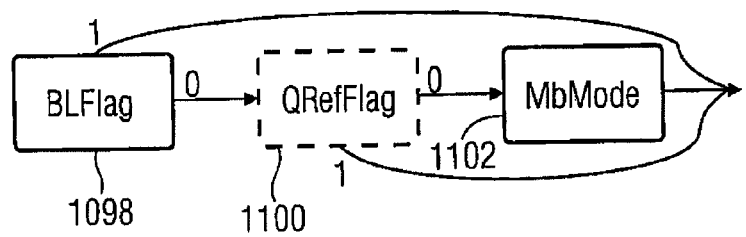
FIG. 6a (macro block mode)
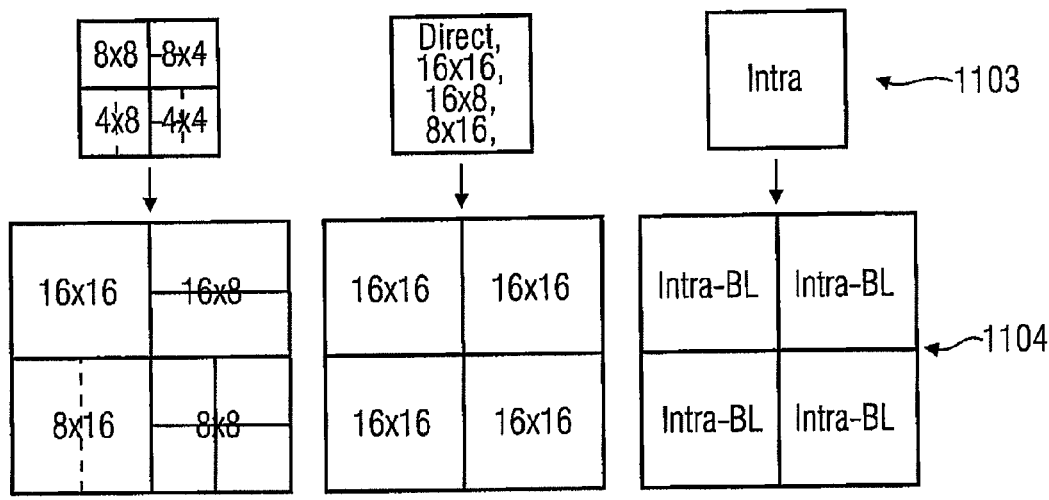
FIG. 6b (upsampling of motion data)
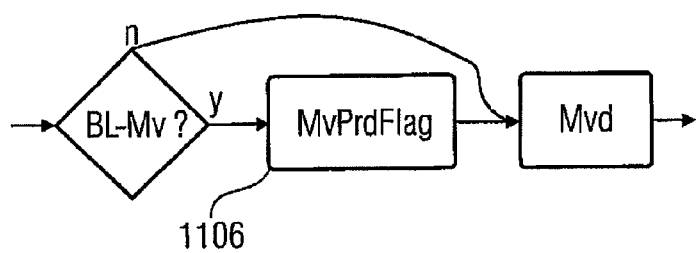
FIG. 6c (motion vector differences)

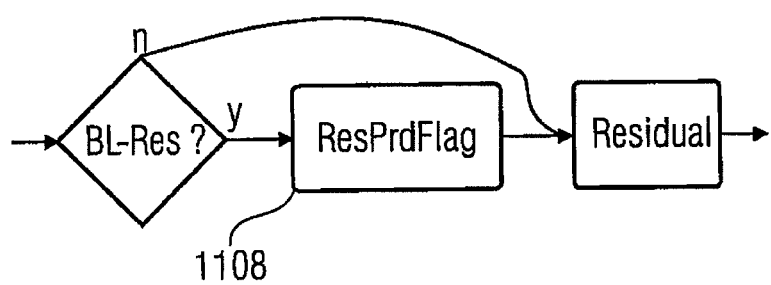
FIG. 6d (residual values syntax enhancement)

APPARATUS AND METHOD FOR GENERATING A CODED VIDEO SEQUENCE BY USING AN INTERMEDIATE LAYER MOTION DATA PREDICTION

CROSS-REFERENCE TO RELATED APPLICATION

This application is a divisional of U.S. patent application Ser. No. 11/070,732, filed Mar. 1, 2005, which claims priority from German Patent Application No. 102004059993.9, which was filed on Dec. 13, 2004, which claims priority from U.S. Provisional Patent Application No. 60/619,457, which was filed on Oct. 15, 2004, each of which is incorporated herein by reference in its entirety.

BACKGROUND OF THE INVENTION

1. Field of the Invention

The present invention relates to video coding systems and particularly to scalable video coding systems, which can be used in connection with the video coding standard H.264/AVC or with new MPEG video coding systems.

2. Description of the Related Art

The standard H.264/AVC is the result of a video standardization project of the ITU-T video coding expert group VCEG and the ISO/IEC motion picture expert group (MPEG). The main goals of this standardization project are to provide a clear video coding concept with very good compression behavior and at the same time to generate a network-friendly video representation, which comprise both application with "conversation character", such as video telephony, as well as applications without conversion character (storage, broadcast, stream transmission).

Apart from the above-mentioned standard ISO/IEC 14496-10, there is also a plurality of publications relating to the standard. Merely exemplarily, reference is made to "The Emerging H.264-AVC standard", Ralf Schäfer, Thomas Wiegand and Heiko Schwarz, EBU Technical Review, January 2003. Additionally, the expert publication "Overview of the H.264/AVC Video Coding Standard", Thomas Wiegand, Gary J. Sullivan, Gesle Bjontegaard and Ajay Lothra, IEEE Transactions on Circuits and Systems for Video Technology, July 2003 as well as the expert publication "Context-based adaptive Binary Arithmethic Coding in the H.264/AVC Video Compression Standard", Detlev Marpe, Heiko Schwarz and Thomas Wiegand, IEEE Transactions on Circuits and Systems for Video Technology, September 2003, comprise a detailed overview over different aspects of the video coding standard.

However, for a better understanding, an overview over the video coding/decoding algorithm will be given with reference to FIGS. 9 to 11.

FIG. 9 shows a full structure of a video coder, which generally consists of two different stages. Generally, the first stage, which generally operates video-related, generates output data, which are then subject to an entropy coding by a second stage, which is designated by 80 in FIG. 9. The data are data 81a, quantized transformation coefficients 81b as well as motion data 81c, wherein these data 81a, 81b, 81c are supplied to the entropy coder 80 to generate a coded video signal at the output of the entropy coder 80.

Specifically, the input video signal is partitioned and splitted, respectively, into macroblocks, wherein every macroblock has 16×16 pixels. Then, the association of the macroblocks to slice groups and slices is chosen, according to which every macroblock of every slice is processed by the net of operation blocks as illustrated in FIG. 8. It should be noted that an efficient parallel-processing of macroblocks is possible when different slices exist in a video picture. The association of macroblocks to slice groups and slices is performed via a block coder control 82 in FIG. 8. There are different slices, which are defined as follows:

I slice: The I slice is a slice wherein all macroblocks of the slice are coded by using an intra prediction.

P slice: Additionally to the coding types of the I slices, certain macroblocks of the P slice can also be coded by using an inter prediction with at least one motion-compensated prediction signal per prediction block.

B slice: Additionally to the coder types available in the P slice, certain macroblocks of the B slice can also be coded by using an inter prediction with two motion-compensated prediction signals per prediction block.

The above three coder types are very similar to the ones in earlier standards, but with the exception of using reference pictures, as will be described below. The following two coder types for slices are new in the standard H.264/AVC:

SP slice: It is also referred to as switch P slice, which is coded such that efficient switching between different pre-coded pictures is made possible.

SI slice: The SI slice is also referred to as switch I slice, which allows an exact adaptation of the macroblocks in a SP slice for a direct random access and for error recovery purposes.

All in all, slices are a sequence of macroblocks, which are processed in the order of a raster scan, if not a property of the flexible macroblock ordering FMO is used, which is also defined in the standard. A picture can be partitioned into one or several slices, as illustrated in FIG. 11. Thus, a picture is a collection of one or several slices. In that sense, slices are independent of one another, since their syntax elements can be analyzed (parsed) from the bit stream, wherein the values of the samples can be decoded correctly in the range of the picture represented by the slice, without requiring data from other slices, provided that used reference pictures are identical both in the coder and in the decoder. However, certain information from other slices can be required to apply the deblocking filter across slice borders.

The FMO characteristic modifies the way how pictures are partitioned into slices and macroblocks, by using the concept of slice groups. Every slice group is a set of macroblocks defined by a macroblock to slice group mapping, which is specified by the content of a picture parameter set and by certain information from slice headers. This macroblock to slice group mapping consists of a slice group identification number for every macroblock in the picture, wherein it is specified to which slice group the associated macroblock belongs. Every slice group can be partitioned into one or several slices, so that a slice is a sequence of macroblocks within the same slice group, which is processed in the order of a raster sampling within the set of macroblocks of specific slice group.

Every macroblock can be transmitted in one or several coder types, depending on the slice coder type. In all slice coder types, the following types of intra coding are supported, which are referred to as $intra_{4\times 4}$ or $intra_{16\times 16}$, wherein additionally a chroma prediction mode and an $I_{PCM}$ prediction mode are supported.

The $intra_{4\times 4}$ mode is based on the prediction of every 4×4 chroma block separately and is very well suited for coding parts of a picture with outstanding details. The $intra_{16\times 16}$ mode, on the other hand, performs a prediction of the whole 16×16 chroma block and is more suited for coding "soft" regions of a picture.

Additionally to these two chroma prediction types, a separate chroma prediction is performed. As an alternative for intra$_{4\times 4}$ and intra$_{16\times 16}$, the I$_{4\times 4}$ coder type allows that the coder simply skips the prediction as well as the transformation coding and instead transmits the values of the coded samples directly. The I$_{PCM}$ mode has the following purposes: It allows the coder to represent the values of the samples precisely. It provides a way to represent the values of very abnormal picture content exactly without data enlargement. Further, it allows to determine a hard boundary for the number of bits, which a coder needs to have for macroblock handling without loss of coding efficiency.

In contrary to earlier video coding standards (namely H.263 plus and MPEG-4 visual), where the intra prediction has been performed in the transformation domain, the intra prediction in H.264/AVC is always performed in the spatial domain, by referring to adjacent samples of previously coded blocks, which are on the left of and above, respectively, the block to be predicted (FIG. 10). In certain environments, where transmission errors occur, this can cause an error propagation, wherein this error propagation takes place due to the motion compensation in intra coded macroblocks. Thus, a limited intra coding mode can be signaled, which enables a prediction of only intra coded adjacent macroblocks.

When the intra$_{4\times 4}$ mode is used, every 4×4 block of spatially adjacent samples is predicted. The 16 samples of the 4×4 block are predicted by using previously decoded samples in adjacent blocks. One of 9 prediction modes can be used for every 4×4 block. Additionally to the "DC prediction" (where a value is used to predict the whole 4×4 block), 8 direction prediction modes are specified. These modes are suitable to predict direction structures in a picture, such as edges in different angles.

Additionally to the intra macroblock coder types, different predictive or motion-compensated coder types are specified as P macroblock types. Every P macroblock type corresponds to a specific partition of the macroblock into the block forms, which are used for a motion-compensated prediction. Partitions with luma block sizes of 16×16, 16×8, 8×8 or 8×16 samples are supported by the syntax. In the case of partitions of 8×8 samples, an additional syntax element is transmitted for every 8×8 partition. This syntax element specifies whether the respective 8×8 partition is further partitioned into partitions of 8×4, 4×8 or 4×4 luma samples and corresponding chroma samples.

The prediction signal for every prediction-coded M×M luma block is obtained by shifting a region of the respective reference picture specified by a translation motion vector and a picture reference index. Thus, if the macroblock is coded by using four 8×8 partitions, and when every 8×8 partition is further partitioned into four 4×4 partitions, a maximum amount of 16 motion vectors for a single P macroblock can be transmitted within the so-called motion field.

The quantization parameter slice QP is used to determine the quantization of the transformation coefficients in H.264/AVC. The parameter can assume 52 values. These values are disposed such that an increase of 1 with regard to the quantization parameter means an increase of the quantization step width by about 12%. This means that an increase of the quantization parameter by 6 causes an increase of the quantizer step width by exactly a factor of 2. It should be noted that a change of the step size by about 12% also means a reduction of the bit rate by about 12%.

The quantized transformation coefficients of a block are generally sampled in zigzag path and processed by using entropy coding methods. The 2×2 DC coefficients of the chroma component are sampled in raster scan sequence and all inverse transformation operations within H.264/AVC can be implemented by using only additions and shift operations of 16 bit integer values.

With reference to FIG. 9, the input signal is first partitioned picture by picture in a video sequence, for every picture, into the macroblocks with 16×16 pixels. Then, every picture is supplied to a subtractor 84, which subtracts the original picture, which is supplied by a decoder 85, which is contained in the coder. The subtraction result, which means the residual signals in the spatial domain, are now transformed, scaled and quantized (block 86) to obtain the quantized transformation coefficients on line 81b. For generating the subtraction signal, which is fed into the subtractor 874, the quantized transformation coefficients are first again scaled and inverse transformed (block 87), to be supplied to an adder 88, the output of which feeds the deblocking filter 89, wherein the output video signal, as, for example, will be decoded by a decoder, can be monitored at the output of the deblocking filter, for example for control purposes (output 90).

By using the decoded output signal at output 90, a motion estimation is performed in block 91. For motion estimation in block 90, a picture of the original video signal is supplied, as seen from FIG. 9. The standard allows two different motion estimations, namely a forward motion estimation and a backward motion estimation. In the forward motion estimation, the motion of the current picture is estimated with regard to the previous picture. In the backward motion estimation, however, the motion of the current picture is estimated by using the future picture.

The results of the motion estimation (block 91) are supplied to a motion compensation block 92, which performs a motion-compensated inter prediction, particularly when a switch 93 is switched to the inter prediction mode, as it is the case in FIG. 9. If, however, the switch 93 is switched to intra frame prediction, an intra frame prediction is performed by using a block 490. Therefore, the motion data are not required, since no motion compensation is performed for an intra frame prediction.

The motion estimation block 91 generates motion data and motion fields, respectively, wherein motion data and motion fields, respectively, which consist of motion vectors, are transmitted to the decoder so that a corresponding inverse prediction, which means reconstruction by using the transformation coefficients and the motion data, can be performed. It should be noted that in the case of a forward prediction, the motion vector can be calculated from the immediately previous picture and from several previous pictures, respectively. Above that, it should be noted that in the case of a backward prediction, a current picture can be calculated by using the immediately adjacent future picture and of course also by using further future pictures.

It is a disadvantage of the video coding concept illustrated in FIG. 9 that it provides no simple scalability possibility. As known in the art, the term "scalability" means a coder/decoder concept where the coder provides a scaled data stream. The scaled data stream comprises a base scaling layer as well as one or several enhancement scaling layers. The base scaling layer comprises a representation of the signal to be coded, generally with lower quality, but also with lower data rate. The enhancement scaling layer contains a further representation of the video signal, which provides a representation with improved quality with regard to the base scaling layer, typically together with the representation of the video signal in the base scaling layer. On the other hand, the enhancement scaling layer has, of course, individual bit requirements, so that the number of bits for representing the signal to be coded increases with every enhancement layer.

Depending on design and possibilities, a decoder will decode, either only the base scaling layer to provide comparatively qualitatively bad representation of the picture signal represented by the coded signal. With every "addition" of a further scaling layer, however, the decoder can improve the quality of the signal step by step (at the expense of the bit rate).

Depending on the implementation and the transmission channel from a coder to a decoder, at least the base scaling layer is transmitted, since the bit rate of the base scaling layer is typically so low that also a so far limited transmission channel will be sufficient. If the transmission channel allows no more bandwidth for the application, only the base scaling layer but no enhancement scaling layer will be transmitted. As a consequence, the decoder can generate merely a low quality representation of the picture signal. Compared to the unscaled case, where the data rate would have been so high that a transmission system would not have been possible, the low quality representation is advantageous. If the transmission channel allows the transmission of one or several enhancement layers, the coder will transmit one or several enhancement layers to the decoder, so that it can increase the quality of the output video signal step by step, depending on the request.

With regard to the coding of video sequences, two different scalings can be distinguished. One scaling is a temporal scaling, in so far that not all video frames of a video sequence are transmitted, but that for reducing the data rate, for example, only every second frame, every third frame, every fourth frame, etc. is transmitted.

The other scaling is the SNR scalability (SNR=signal to noise ratio), wherein every scaling layer, e.g. both the base scaling layer and the first, second, third, . . . enhancement scaling layer comprise all time information, but with varying quality. Thus, the base scaling layer would have a low data rate, but a low signal noise ratio, wherein this signal noise ratio can then be improved step by step by adding one enhancement scaling layer each.

The coder concept illustrated in FIG. 9 is problematic in that it is based on the fact that merely residual values are generated by the subtracter 84, and are then processed. These residual values are calculated based on prediction algorithms, in the arrangement shown in FIG. 9, which forms a closed loop by using the blocks 86, 87, 88, 89, 93, 94 and 84, wherein a quantization parameter enters the closed loop, which means in blocks 86, 87. If now a simple SNR scalability would be implemented in that for example every predicted residual signal is quantized first with a coarse quantizer step width, and then quantized step by step with finer quantizer step widths, by using enhancement layers, this would have the following consequences. Due to the inverse quantization and the prediction, particularly with regard to the motion estimation (block 91) and the motion compensation (block 92), which take place by using the original picture on the one hand and the quantized picture on the other hand, a "diverging" of the quantizer step widths results both in the coder and the decoder. This leads to the fact that the generation of the enhancement scaling layers on the coder side becomes very problematic. Further, processing the enhancement scaling layers on the decoder side becomes impossible, at least with regard to the elements defined in the standard H.264/AVC. The reason therefore is the closed loop in the video coder illustrated with regard to FIG. 9, wherein the quantization is contained.

In the standardization document JVT-I 032 t1 titled "SNR-Scalable Extension of H.264/AVC", Heiko Schwarz, Detlev Marpe and Thomas Wiegand, presented in the ninth JVT meeting from 2 to 5 Dec. 2003 in San Diego, scalable extension to H.264/AVC is presented, which comprises a scalability both with regard to time and signal noise ratio (with equal or different temporal accuracy). Therefore, a lifting representation of time subband partitions is introduced, which allows the usage of known methods for motion-compensated prediction.

Wavelet based video coder algorithms, wherein lifting implementations are used for the wavelet analysis and for wavelet synthesis, are described in J.-R. Ohm, "Complexity and delay analysis of MCTF interframe wavelet structures", ISO/IECJTC1/WG11 Doc.M8520, July 2002. Comments on scalability can also be found in D. Taubman, "Successive refinement of video: fundamental issues, past efforts and new directions", Proc. of SPIE (VCIP '03), vol. 5150, pp. 649-663, 2003, wherein, however, significant coder structure alterations are required. According to the invention, a coder/decoder concept is achieved, which has, on the one hand, the scalability possibility and can, on the other hand, be based on elements in conformity with the standard, particularly, e.g., for the motion compensation.

Before reference will be made in more detail to a coder/decoder structure with regard to FIG. 3, first, a basic lifting scheme on the side of the coder and an inverse lifting scheme on the side of the decoder, respectively, will be illustrated with regard to FIG. 4. Detailed explanations about the background of the combination of lifting schemes and wavelet transformations can be found in W. Sweldens, "A custom design construction of biorthogonal wavelets", J. Appl. Comp. Harm. Anal., vol. 3 (no. 2), pp. 186-200, 1996 and I. Daubechies and W. Sweldens, "Factoring wavelet transforms into lifting Steps", J. Fourier Anal. Appl., vol. 4 (no. 3), pp. 247-269, 1998. Generally, the lifting scheme consists of three steps, the polyphase decomposition step, the prediction step and the update step.

The decomposition step comprises partitioning the input side data stream into an identical first copy for a lower branch 40a as well as an identical copy for an upper branch 40b. Further, the identical copy of the upper branch 40b is delayed by a time stage ($z^{-1}$), so that a sample $s_{2k+1}$ with an odd index k passes through a respective decimator and downsampler 42a, 42b, respectively, at the same as a sample with an even index $s_{2k}$. The decimator 42a and 42b, respectively, reduces the number of samples in the upper and the lower branch 40b, 40a, respectively, by eliminating every second sample.

The second region II, which relates to the prediction step, comprises a prediction operator 43 as well as a subtracter 44. The third region, which means the update step, comprises an update operator 45 as well as an adder 46. On the output side, two normalizers 47, 48 exist, for normalizing the high-pass signal $h_k$ (normalizer 47) and for normalizing the low-pass signal $l_k$ through the normalizer 48.

Particularly, the polyphase decomposition leads to the partitioning of even and odd samples of a given signal s[k]. Since the correlation structure typically shows a local characteristic, the even and odd polyphase components are highly correlated. Thus, in a final step, a prediction (P) of the odd samples is performed by using the integer samples. The corresponding prediction operator (P) for every odd sample $s_{odd}[k]=s[2k+1]$ is a linear combination of the adjacent even samples $s_{even}[k]=s[2k]$, i.e.

$$P(s_{even})[k] = \sum_l p_l s_{even}[k+l].$$

As a result of the prediction step, the odd samples are replaced by their respective prediction residual values $$h[k] = s_{odd}[K] - P(s_{even})[k]$$

It should be noted that the prediction step is equivalent to performing a high-pass filter of a two channel filter bank, as it is illustrated in I. Daubechies and W. Sweldens, "Factoring wavelet transforms into lifting steps", J. Fourier Anal. Appl. vol 4 (no. 3), pp. 247-269, 1998.

In the third step of the lifting scheme, low-pass filtering is performed, by replacing the even samples $s_{even}[k]$ by a linear combination of prediction residual values h[k]. The respective update operator U is given by $$U(h)[k] = \sum_l u_l h[k+l].$$

By replacing the even samples with $$l[K] = s_{even}[k] + U(h)[k]$$

the given signal s[k] can finally be represented by l(k) and h(k), wherein every signal has half the sample rate. Since both the update step and the prediction step are fully invertible, the corresponding transformation can be interpreted as critically sampled perfect reconstruction filter bank. Indeed, it can be shown that any biorthogonal family of wavelet filters can be realized by a sequence of one or several prediction steps and one or several update steps. For a normalization of low-pass and high-pass components, the normalizers 47 and 48 are supplied with suitably chosen scaling factors $F_l$ and $F_h$, as has been explained.

The inverse lifting scheme, which corresponds to the synthesis filter bank, is shown in FIG. 4 on the right hand side. It consists simply of the application of the prediction and update operator in inverse order and with inverse signs, followed by the reconstruction by using the even and odd polyphase components. Specifically, the right decoder shown in FIG. 4 comprises again a first decoder region I, a second decoder region II as well as a third decoder region III. The first decoder region cancels the effect of the update operator 45. This is effected by supplying the high-pass signal, which has been re-normalized by a further normalizer 50, to the update operator 45. Then, the output signal of the decoder side update operator 45 is supplied to a subtracter 52, in contrary to the adder 46 in FIG. 4. Correspondingly, the output signal of the predictor 43 is processed, the output signal of which is now supplied to an adder 53 and not to a subtracter as on the coder side. Now, an upsampling of the signal by the factor 2 takes place in every branch (blocks 54a, 54b). Then, the upper branch is shifted by one sample into the future, which is equivalent to delaying the lower branch, to perform then an addition of the data streams on the upper branch and the lower branch in an adder 55, to obtain the reconstructed signal $s_k$ at the output of the synthesis filter bank.

Several wavelets can be implemented by the predictor 43 and the update-operator 45, respectively. If the so-called hair wavelet is to be implemented, the prediction operator and the update operator are given by the following equation:

$$P_{Hair}(s_{even})[k] = s[2k] \text{ and } U_{Hair}(h)[k] = \frac{1}{2}h[k],$$

such that $$h[k] = s[2k+1] - s[2k]$$

and $$l[k] = s[2k] + \frac{1}{2}h[k] = \frac{1}{2}(s[2k] + s[2k+1])$$

correspond to the non-normalized high-pass and low-pass (analysis) output signal, respectively, of the hair filter.

In the case of the 5/3 biorthogonal spline wavelet, the low-pass and high-pass analysis filter of this wavelet have and 3 filter taps, respectively, wherein the corresponding scaling function is a second order B spline. In coder applications for still pictures, such as JPEG 2000, this wavelet is used for a time subband coder scheme. In a lifting environment, the corresponding prediction and update operators of the 5/3 transformation are given as follows:

$$P_{5/3}(s_{even})[k] = \frac{1}{2}(s[2k] + s[2k+2])$$

and $$U_{5/3}(h)[k] = \frac{1}{4}(h[k] + h[k-1])$$

FIG. 3 shows a block diagram of a coder/decoder structure with exemplary four filter levels both on the side of the coder and on the side of the decoder. From FIG. 3, it can be seen that the first filter level, the second filter level, the third filter level and the fourth filter level are identical with regard to the coder. The filter levels with regard to the decoder are also identical. On the coder side, every filter level comprises a backward predictor $M_{i0}$ as well as a forward predictor $M_{i1}$ 61 as central elements. The backward predictor 60 corresponds in principle to the predictor 43 of FIG. 4, while the forward predictor 61 corresponds to the update operator of FIG. 4.

In contrary to FIG. 4, it should be noted that FIG. 4 relates to a stream of samples, where a sample has an odd index 2k+1, while another sample has an even index 2k. However, as has already been explained with regard to FIG. 1, the notation in FIG. 3 relates to a group of pictures instead of to a group of samples. If a picture has for example a number of samples and pictures, respectively, this picture is fed in fully. Then, the next picture is fed in, etc. Thus, there are no longer odd and even samples, but odd and even pictures. According to the invention, the lifting scheme described for odd and even samples is applied to odd and even pictures, respectively, each of which has a plurality of samples. Now, the sample by sample predictor 43 of FIG. 4 becomes the backward motion compensation prediction 60, while the sample by sample update operator 45 becomes the picture by picture forward motion compensation prediction 61.

It should be noted that the motion filters, which consist of motion vectors and represent coefficients for the block and 61, are calculated for two subsequent related pictures and are transmitted as side information from coder to decoder. However, it is a main advantage of the inventive concept that the elements 91, 92, as they are described with reference to FIG. 9 and standardized in standard H.264/AVC, can easily be used to calculate both the motion fields $M_{i0}$ and the motion fields $M_{i1}$. Thus, no new predictor/update operator has to be used for the inventive concept, but the already existing algorithm mentioned in the video standard, which is examined and checked for functionality and efficiency, can be used for the motion compensation in forward direction or backward direction.

Particularly, the general structure of the used filter bank illustrated in FIG. 3 shows a temporal decomposition of the video signal with a group of 16 pictures, which are fed in at an input 64. The decomposition is a dyadic temporal decomposition of the video signal, wherein in the embodiment shown in FIG. 3 with four levels $2^4=16$ pictures, which means a group size of 16 pictures, is required to achieve the representation with the smallest temporal resolution, which means the signals at the output 28a and at the output 28b. Thus, if 16 pictures are grouped, this leads to a delay of 16 pictures, which makes the concept shown in FIG. 3 with four levels rather problematic for interactive applications. Thus, if interactive applications are aimed at, it is preferred to form smaller groups of pictures, such as to group four or eight pictures. Then, the delay is correspondingly reduced, so that the usage for interactive applications becomes possible. In cases where interactivity is not required, such as for storage purposes, etc., the number of pictures in a group, which means the group size, can be correspondingly increased, such as to 32, 64, etc. pictures.

In that way, an interactive application of the hair-based motion-compensated lifting scheme is used, which consists of the backward motion compensation prediction ($M_{i1}$), as in H.264/AVC, and that further comprises an update step, which comprises a forward motion compensation ($M_{i1}$). Both the prediction step and the update step use the motion compensation process, as it is illustrated in H.264/AVC. Further, not only the motion compensation is used, but also the deblocking filter 89 designated with the reference number 89 in FIG. 9.

The second filter level comprises again downsampler 66a, 66b, a subtracter 69, a backward predictor 67, a forward predictor 68 as well as an adder 70 and a further processing means to output the first and second high-pass picture of the second level at an output of the further processing means, while the first and second low-pass picture of the second level are output at the output of the adder 70.

Additionally, the coder in FIG. 3 comprises a third level as well as a fourth level, wherein a group of 16 pictures is fed into the fourth-level input 64. At a fourth-level high-pass output 72, which is also referred to as HP4, eight high-pass pictures quantized with a quantization parameter Q and correspondingly processed are output. Correspondingly, eight low-pass pictures are output at a low-pass output 73 of the fourth filter level, which is fed into an input 74 of the third filter level. This level, again, is effective to generate four high-pass pictures at a high-pass output 75, which is also referred to as HP3, and to generate four low-pass pictures at a low-pass output 76, which are fed into the input 10 of the second filter level and decomposed.

It should particularly be noted that the group of pictures processed by a filter level does not necessarily have to be video pictures originating from an original video sequence, but can also be low-pass pictures, which are output by a next higher filter level at a low-pass output of the filter level.

Further, it should be noted that the coder concept shown in FIG. 3 for 16 pictures can easily be reduced to eight pictures, when simply the fourth filter level is omitted and the group of pictures is fed into the input 74. In the same way, the concept shown in FIG. 3 can also be extended to a group of 32 pictures, by adding a fifth filter level and by outputting then 16 high-pass pictures at a high-pass output of the fifth filter level and feeding the sixteen low-pass pictures at the output of the fifth filter level into the input 64 of the fourth filter level.

The tree-like concept of the coder side is also applied to the decoder side, but now no longer, like on the coder side, from the high level to the lower level but, on the decoder side, from the lower level to the higher level. Therefore, the data stream is received from a transmission medium, which is schematically referred to as network abstraction layer 100, and the received bit stream is first subject to an inverse further processing by using the inverse further processing means, to obtain a reconstructed version of the first high-pass picture of the first level at the output of means 30a and a reconstructed version of the first-level low-pass picture at the output of block 30b of FIG. 3. Then, analogous to the right half of FIG. 4, first the forward motion compensation prediction is reversed via the predictor 61, to subtract then the output signal of the predictor 61 from the reconstructed version of the low-pass signal (subtracter 101).

The output signal of the subtracter 101 is fed into a backward compensation predictor 60 to generate a prediction result, which is added to the reconstructed version of the high-pass picture in an adder 102. Then, both signals, which means the signals in the lower branch 103a, 103b, are brought to the double sample rate, by using the upsampler 104a, 104b, wherein then the signal on the upper branch is either delayed or "accelerated", depending on the implementation. It should be noted that the upsampling is performed by the bridge 104a, 104b simply by inserting a number of zeros which corresponds to the number of samples for a picture. The shift by the delay of a picture by the element shown with $z^{-1}$ in the upper branch 103b against the lower branch 103a effects that the addition by an adder 106 causes that the two second-level low-pass pictures occur subsequently on the output side with regard to the adder 106.

The reconstructed versions of the first and second second-level low-pass picture are then fed into the decoder-side inverse filter of the second level and there they are combined again with the transmitted second-level high-pass pictures by the identical implementation of the inverse filter bank to obtain a sequence of four third-level low-pass pictures at an output 101 of the second level. The four third-level low-pass pictures are then combined in an inverse filter level of the third level with the transmitted third-level high-pass pictures to obtain eight fourth-level low-pass pictures in subsequent format at an output 110 of the inverse third-level filter. These eight third-level low-pass pictures will then be combined again with the eight fourth-level high-pass pictures received from the transmission medium 100 via the input HP4, in an inverse fourth-level filter, as discussed with regard to the first level, to obtain a reconstructed group of 16 pictures at an output 112 of the inverse fourth-level filter.

Thus, in every stage of the analysis filter bank, two pictures, either original pictures or pictures representing low-pass signals and generated in a next higher level, are decomposed into a low-pass signal and a high-pass signal. The low-pass signal can be considered as representation of the common characteristics of the input pictures, while the high-pass signal can be considered as representation of the differences between the input pictures. In the corresponding stage of the synthesis filter bank, the two input pictures are again reconstructed by using the low-pass signal and the high-pass signal. Since the inverse operations of the analysis step are performed in the synthesis step, the analysis/synthesis filter bank (without quantization, of course) guarantees a perfect reconstruction.

The only occurring losses occur due to the quantization in the further processing means, such as 26a, 26b, 18. If quantization is performed very finely, a good signal noise ratio is achieved. If, however, quantization is performed very coarsely, a relatively bad signal noise ratio is achieved, but with a low bit rate, which means low demand.

Without SNR scalability, a time scaling control could be implemented already with the concept shown in FIG. 3. Therefore, a time scaling control 120 is used, which is formed to obtain the high-pass and low-pass output, respectively, and the outputs of the further processing means (26a, 26b, 18 . . . ) respectively, at the input side to generate a scaled data stream from these partial data streams TP1, HP1, HP2, HP3, HP4, which has the processed version of the first low-pass picture and the first high-pass picture in a base scaling layer. Then, the processed version of the second high-pass picture could be accommodated in a first enhancement scaling layer. The processed versions of the third-level high-pass pictures could be accommodated in a second enhancement scaling layer, while the processed versions of the fourth-level high-pass pictures are introduced in a third enhancement scaling layer. Thereby, merely based on the base scaling layer, a decoder could already generate a sequence of lower-level low-pass pictures with a lower time quality, which means two first-level low-pass pictures per group of pictures. With the addition of every enhancement scaling layer, the number of reconstructed pictures per group can always be doubled. The functionality of the decoder is typically controlled by a scaling control, which is formed to detect how many scaling layers are contained in the data stream and how many scaling layers have to be considered by the decoder during decoding, respectively.

The JVT document JVT-J035 with the title "SNR-Scalable Extension of H.264/AVC" Heiko Schwarz, Detlev Marpe and Thomas Wiegand, presented during the tenth JVT meeting in Waikoloa Hi., $8^{th}$ to 12 Dec. 2003, shows a SNR scalable extension of the temporal decomposition scheme illustrated in FIGS. 3 and 4. Particularly, a time scaling layer is partitioned into individual "SNR scaling sublayers", wherein a SNR base layer is obtained in such that a certain time scaling layer is quantized with a first coarser quantizer step width to obtain the SNR base layer. Then, among other things, an inverse quantization is performed, and the result signal from the inverse quantization is subtracted from the original signal to obtain a difference signal, which is then quantized with a finer quantizer step width to obtain the second scaling layer. However, the second scaling layer is requantized with the finer quantizer step width to subtract the signal obtained after the requantization from the original signal to obtain a further difference signal, which, again after quantization, but now with a finer quantizer step width, represents a second SNR scaling layer and an SNR enhancement layer, respectively.

Thus, it has been found out that the above described scalability schemes, which are based on the motion-compensated temporal filtering (MCTF), already provide a high flexibility with regard to the temporal scalability and also the SNR scalability. But there is still a problem in that the bit rate of several scaling layers together is still significantly above the bit rate, which can be achieved when pictures of the highest quality would be coded without scalability. Due to the side information for the different scaling layers, scalable coders might never obtain the bit rate of the unscaled case. However, the bit rate of a data stream with several scaling layers should approach the bit rate of the unscaled case as closely as possible.

Further, the scalability concept should provide high flexibility for all scalability types, which means a high flexibility both with regard to time and space and also with regard to SNR.

The high flexibility is particularly important where already pictures with low resolution would be sufficient but a higher temporal resolution is desirable. Such a situation results, for example, when fast changes exist in pictures, such as, for example, in videos of team sports, where additionally to the ball, many persons move at the same time.

A further disadvantage of existing scalability concepts is that they either use the identical motion data for all scaling layers, which either limits the flexibility of the scalability or results in a non-optimum motion prediction and an increasing residual signal of the motion prediction, respectively.

On the other hand, a completely different motion data transmission of two different scaling layers leads to a significant overhead, since particularly when relatively low SNR scaling layers are considered, where quantization is performed relatively coarse, the portion of motion data in the overall bit stream becomes noticeable. A flexible scalability concept, wherein different motion data and different scaling layers become possible at all, is thus paid for by an additional bit rate, which is particularly disadvantageous with regard to the fact that all efforts are to reduce the bit rate. Further, the additional bits for the transmission of motion data stand out particularly in the lower scaling layers, compared to the bits for the motion prediction residual values. However, exactly there, this is particularly unpleasant, since in the lower scaling layers the effort is made to obtain a sufficiently acceptable quality which means to use at least a sufficiently reasonable quantization parameter and at the same time to obtain a lower bit rate.

SUMMARY OF THE INVENTION

It is an object of the present invention to provide a scalable video coder system concept, which provides a lower data rate and still shows flexibility.

In accordance with a first aspect, the present invention provides an apparatus for generating a coded video sequence having a base scaling layer and enhancement scaling layer, having: a base motion compensator for calculating base motion data, which indicate how a block in a current picture has moved in relation to another picture in a group of pictures; a base motion predictor for calculating a base sequence of residual error pictures by using the base motion data; a base picture coder, which is formed to generate a coded first scaling layer from the base sequence of residual error pictures; an enhancement motion compensator for determining enhancement motion data; wherein the enhancement motion compensator is formed to determine enhancement motion data adaptively and block by block by using the base motion data and to provide signalization information block by block; an enhancement motion predictor for calculating an enhancement sequence of residual error pictures by using the enhancement motion data; and an enhancement picture coder for coding information about the enhancement sequence of residual error pictures and for coding the signalization information block by block to obtain a coded enhancement scaling layer.

In accordance with a second aspect, the present invention provides a method for generating a coded video sequence having a base scaling layer and an enhancement scaling layer, having the steps of: calculating base motion data, which indicate how a block in a current picture has moved in relation to another picture in a group of pictures; calculating a base sequence of residual error pictures by using the base motion data; performing a base picture coding to generate a coded first scaling layer from the base sequence of residual error pictures; determining enhancement motion data wherein enhancement motion data are determined adaptively and block by block by using the base motion data, and wherein signalization information are provided adaptively and block by block; calculating an enhancement sequence of residual error pictures by using the enhancement motion data; and performing an enhancement picture coding by coding information about the enhancement sequence of residual error pictures and by coding the block by block signalization information to obtain a coded enhancement scaling layer.

In accordance with a third aspect, the present invention provides an apparatus for decoding a coded video sequence with a base scaling layer and an enhancement scaling layer, having: a base picture decoder for decoding the base scaling layer to obtain a decoded base sequence of residual error pictures and base motion data; a base motion combiner, which is formed to obtain a sequence of pictures of the base scaling layer by using the base motion data and the decoded sequence of residual error pictures; an enhancement picture decoder for decoding the enhancement scaling layer to obtain information about an enhancement sequence of residual error pictures and information about enhancement motion data; an enhancement motion data calculating means for calculating the enhancement motion data by evaluating the information about the enhancement motion data and by using information about base motion data due to the evaluated information about the enhancement motion data; and an enhancement motion combiner, which is formed to obtain a sequence of pictures of the enhancement scaling layer by using the enhancement sequence of residual error pictures and the enhancement motion data.

In accordance with a fourth aspect, the present invention provides a method for decoding a coded video sequence with a base scaling layer and an enhancement scaling layer, having the steps of: decoding the base scaling layer to obtain a decoded base sequence of residual error pictures and base motion data; performing a base motion combination by using the base motion data and the decoded sequence of residual error pictures, so that a sequence of pictures of the base scaling layer is obtained; decoding the enhancement scaling layer to obtain information about an enhancement sequence of residual error pictures and information about enhancement motion data; calculating the enhancement motion data by evaluating the information about the enhancement motion data and by using information about base motion data due to the evaluated information about the enhancement motion data; and performing an enhancement motion combination to obtain a sequence of pictures of the enhancement scaling layer by using the enhancement sequence of residual error pictures and the enhancement motion data.

In accordance with a fifth aspect, the present invention provides a computer program for performing a method for generating a coded video sequence having a base scaling layer and an enhancement scaling layer, having the steps of: calculating base motion data, which indicate how a block in a current picture has moved in relation to another picture in a group of pictures; calculating a base sequence of residual error pictures by using the base motion data; performing a base picture coding to generate a coded first scaling layer from the base sequence of residual error pictures; determining enhancement motion data wherein enhancement motion data are determined adaptively and block by block by using the base motion data, and wherein signalization information are provided adaptively and block by block; calculating an enhancement sequence of residual error pictures by using the enhancement motion data; and performing an enhancement picture coding by coding information about the enhancement sequence of residual error pictures and by coding the block by block signalization information to obtain a coded enhancement scaling layer; or a method for decoding a coded video sequence with a base scaling layer and an enhancement scaling layer, having the steps of: decoding the base scaling layer to obtain a decoded base sequence of residual error pictures and base motion data; performing a base motion combination by using the base motion data and the decoded sequence of residual error pictures, so that a sequence of pictures of the base scaling layer is obtained; decoding the enhancement scaling layer to obtain information about an enhancement sequence of residual error pictures and information about enhancement motion data; calculating the enhancement motion data by evaluating the information about the enhancement motion data and by using information about base motion data due to the evaluated information about the enhancement motion data; and performing an enhancement motion combination to obtain a sequence of pictures of the enhancement scaling layer by using the enhancement sequence of residual error pictures and the enhancement motion data; when the method runs on a computer.

In accordance with a sixth aspect, the present invention provides a computer readable medium with a coded video sequence having a base scaling layer and an enhancement scaling layer, wherein the coded video sequence is formed such that it results in a decoded first scaling layer and a decoded second scaling layer when it is decoded in an apparatus for decoding a coded video sequence with a base scaling layer and an enhancement scaling layer, having: a base picture decoder for decoding the base scaling layer to obtain a decoded base sequence of residual error pictures and base motion data; a base motion combiner, which is formed to obtain a sequence of pictures of the base scaling layer by using the base motion data and the decoded sequence of residual error pictures; an enhancement picture decoder for decoding the enhancement scaling layer to obtain information about an enhancement sequence of residual error pictures and information about enhancement motion data; an enhancement motion data calculating means for calculating the enhancement motion data by evaluating the information about the enhancement motion data and by using information about base motion data due to the evaluated information about the enhancement motion data; and an enhancement motion combiner, which is formed to obtain a sequence of pictures of the enhancement scaling layer by using the enhancement sequence of residual error pictures and the enhancement motion data.

The present invention is based on the knowledge that further data rate savings with simultaneous flexibility with regard to different SNR or spatial scaling layers is obtained by using the base motion data in the calculation of enhancement motion data within an enhancement motion compensation for the enhancement scaling layer. Thus, according to the invention, in the calculation of the enhancement motion data, it is not pretended that there were no motion data of the base layer, but the motion data of the base layer are integrated into the calculation.

Here, according to preferred embodiments of the present invention, an adaptive concept is used, i.e. that for different blocks of a picture different ways of considering the base motion data can be performed, and that obviously for one block an enhancement motion data prediction with the base motion data as predictor can be fully omitted when it is proved that the prediction provides no success in the data reduction. Whether an enhancement motion data prediction has been performed at all by using the base motion data and of what type it was, is transmitted in the bit stream with signalization information associated to a block and indicated to the decoder. Thereby, the decoder is able to resort to the base motion data already reconstructed in the decoder for the reconstruction of the motion data for a block to the, wherein the fact that is has to resort at all and in what way it has to resort is signalized by signalization information in the bit stream transmitted block by block.

Depending on the implementation, the base motion data can be considered in the actual calculation of the enhancement motion data, as they will be used subsequently by the enhancement motion compensator. However, according to the invention, it is also preferred to calculate the enhancement motion data independently of the base motion data and to use the base motion data merely when postprocessing the enhancement motion data to obtain the enhancement motion data which are actually transmitted to the enhancement picture coder. Thus, according to the invention, in the sense of a high flexibility, an independent calculation of enhancement motion data is performed, wherein these are used independent of the enhancement motion data calculated from the base motion data for coder side motion prediction, while the base motion data are merely used for the purpose of calculating a residual signal of any type to reduce the required bits for transmitting the enhancement motion vectors.

In a preferred embodiment of the present invention, the motion data intermediate layer prediction is supplemented by an intermediate layer residual value prediction, to utilize redundancies between the different scaling layers as best as possible also in residual values of the motion-compensated prediction and to consider them for data rate reduction purposes.

In a preferred embodiment of the present invention, a bit rate reduction is not only obtained by a motion-compensated prediction performed within a scaling layer, but also with an intermediate scaling layer prediction of the residual pictures after the motion-compensated prediction of a lower layer, for example the base layer, to a higher layer, such as the enhancement layer.

It has been found out that within the same temporal scaling layer, the residual values of the individual considered other scaling layers, which are scaled preferably with regard to the resolution or with regard to the signal noise ratio (SNR), also have correlations between the residual values after the motion-compensated prediction. According to the invention, these correlations are advantageously utilized in that an intermediate layer predictor is provided on the coder side for the enhancement scaling layer, which corresponds to an intermediate layer combiner on the decoder side. Preferably, this intermediate layer predictor is designed adaptively, in order to decide, e.g., for every macroblock, whether an intermediate layer prediction is worth the effort, or whether the prediction would rather lead to a bit rate increase. The latter is the case when the prediction residual signal becomes larger than the original motion compensation residual signal of the enhancement layer with regard to a subsequent entropy coder. However, the situation will not occur in many cases, so that the intermediate layer predictor is activated and leads to a significant bit rate reduction.

BRIEF DESCRIPTION OF THE DRAWINGS

These and other objects and features of the present invention will become clear from the following description taken in conjunction with the accompanying drawings, in which:

FIG. 1a is a preferred embodiment of an inventive coder;

FIG. 1b is a detailed representation of a base picture coder of FIG. 1a;

FIG. 1c is a discussion of the functionality of an intermediate layer prediction flag;

FIG. 1d is a description of a motion data flag;

FIG. 1e is a preferred implementation of the enhancement motion compensator 1014 of FIG. 1a;

FIG. 1f is a preferred implementation of the enhancement motion data determination means 1078 of FIG. 2;

FIG. 1g is an overview representation of three preferred embodiments for calculating the enhancement motion data and for enhancement motion data processing for the purpose of signalization and residual data transmission, if necessary;

FIG. 2 is a preferred embodiment of an inventive decoder;

FIG. 5a is a representation of the functionality of the lifting scheme shown in FIG. 4;

FIG. 5b is a representation of two preferred lifting specifications with unidirectional prediction (hair wavelet) and bidirectional prediction (5/3 transformation);

FIG. 5c is a preferred embodiment of the prediction and update operators with motion compensation and reference indices for an arbitrary choice of the two pictures to be processed by the lifting scheme;

FIG. 5d is a representation of the intra mode where original picture information can be inserted macroblock by macroblock into high-pass pictures;

FIG. 6a is a schematic representation for signalizing a macroblock mode;

FIG. 6b is a schematic representation for upsampling of motion data in a spatial scalability according to a preferred embodiment of the present invention;

FIG. 6c is a schematic representation of the data stream syntax for motion vector differences;

FIG. 6d is a schematic representation of a residual value syntax enhancement according to a preferred embodiment of the present invention;

FIG. 1a shows a preferred embodiment of an apparatus for generating a coded video sequence, which has a base scaling layer and an enhancement scaling layer. An original video sequence with a group of 8, 16 or any number of pictures is fed in via an input 1000. On the output side, the coded video sequence contains the base scaling layer 1002 and the enhancement scaling layer 1004. The enhancement scaling layer 1004 and the base scaling layer 1002 can be supplied to a bit stream multiplexer, which generates a single scalable bit stream on the output side. Depending on the implementation, however, a separate transmission of the two scaling layers is also possible and useful in some cases. FIG. 1a shows a coder for generating two scaling layers, which means the base scaling layer and an enhancement scaling layer. In order to obtain a coder, which, if necessary, generates one or several further enhancement layers, the functionality of the enhancement scaling layer is to be repeated, wherein a higher enhancement scaling layer is always supplied with data by the next lower enhancement scaling layer, as the enhancement scaling layer 1004 shown in FIG. 1 is supplied with data by the base scaling layer 1002.

Figure 3:
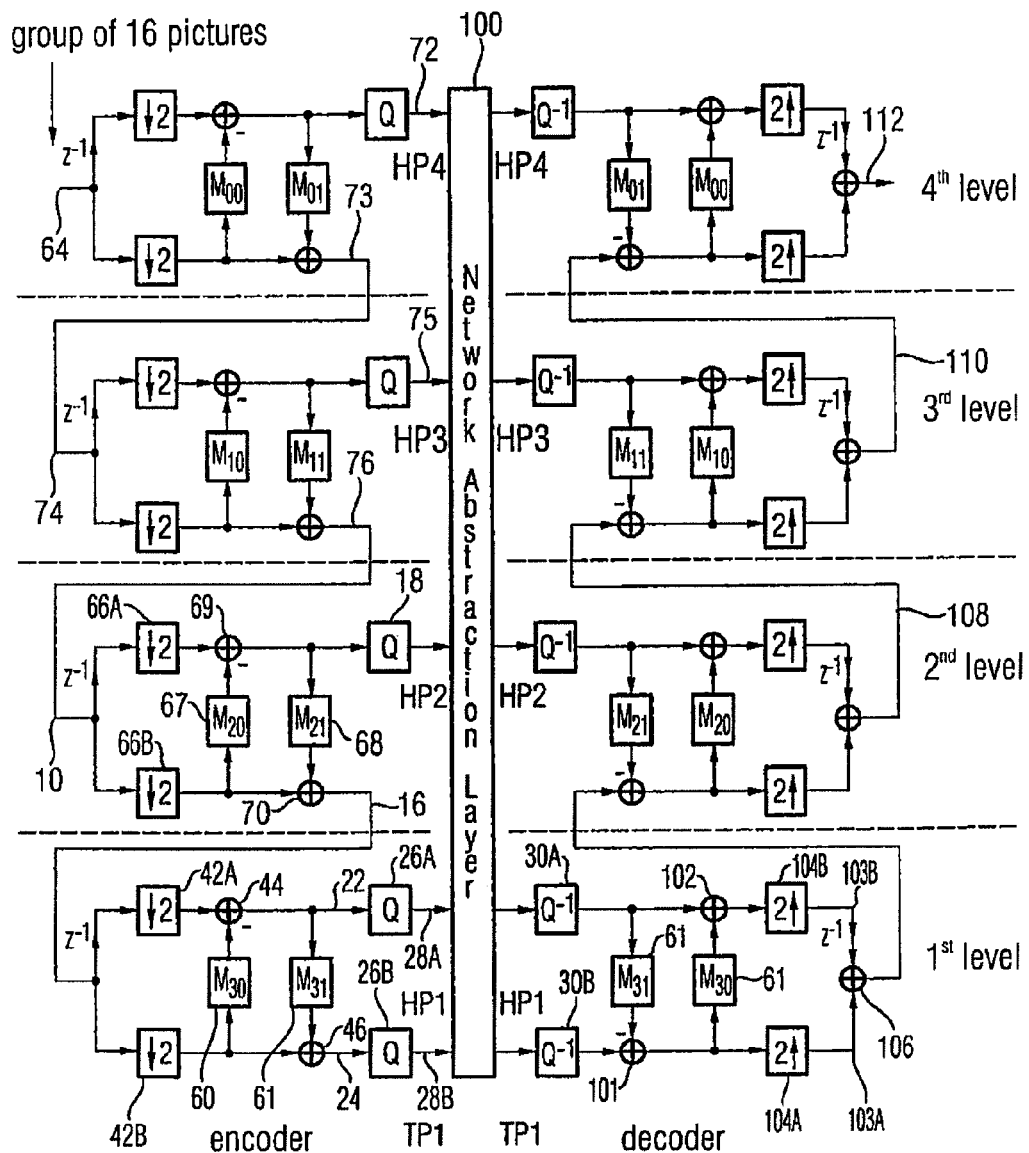
FIG. 3 is a block diagram of a decoder with four levels.

Before reference will be made to different scaling types in detail, such as a SNR scalability or a spatial scalability or a combined scalability of spatial and SNR scalability, first, the basic principle of the present invention will be illustrated. First, the coder comprises a base motion compensator or base motion estimator 1006 for calculating base motion data, which indicates how a macroblock has moved in a current picture in relation to another picture in a group of pictures, which the base motioned compensator 1006 obtains on the input side. Techniques for calculating motion data, particularly for calculating a motion vector for a macroblock, which is basically a region of pixels in a digital video picture, are known. Preferably, the motion compensation calculation is used, as it is standardized in the video coding standard H.264/AVC. Thereby, a macroblock of a later picture is considered and it is determined, how the macroblock "moved" in comparison to an earlier picture. This motion (in xy direction) is indicated by a two-dimensional motion vector, which is calculated by block 1006 for every macroblock and supplied to a base picture coder 1010 via a motion data line 1008. Then, it is calculated for the next picture, how a macroblock has moved from the previous picture to the next picture.

In one implementation, this new motion vector, which, in a way, indicates the motion from second to a third picture, can be transmitted again as two-dimensional vector. For efficiency reasons, however, it is preferred to transmit only a motion vector difference, which means the difference of the motion vector of a macroblock from the second to the third picture and the motion vector of the macroblock from the first to the second picture. Alternative referencings and motion vector differences, respectively, to not immediately previous pictures, but to further preceding pictures can also be used.

The motion data, which have been calculated by block 1006, will then be supplied to a base motion predictor 1012, which is designed to calculate a base sequence of residual error pictures for using the motion data and the group of pictures. Thus, the base motion predictor performs the motion compensation, which has, in a way, been prepared by the motion compensator and motion estimator, respectively. This base sequence of residual error pictures will then be supplied to the base picture coder. The base picture coder is formed to provide the base scaling layer 1002 at its output.

Further, the inventive coder comprises an enhancement motion compensator or enhancement motion estimator 1014 for detecting enhancement motion data. These enhancement motion data are supplied to an enhancement motion predictor 1016, which generates an enhancement sequence of residual error pictures on the output side and supplies them to a downstream intermediate layer predictor 1018. Thus, the enhancement motion predictor performs the motion compensation, which, in a way, has been prepared by the motion compensator and motion estimator, respectively.

The intermediate layer predictor is formed to calculate enhancement prediction residual error pictures on the output side. Depending on the implementation, the intermediate layer predictor uses additionally to the data, which it obtains from block 1016, which means additionally to the enhancement sequence of residual error pictures, the base sequence of residual error pictures, as it is provided by block 1012 via a dotted bypass line 1020. Alternatively, the block 1018 can also use an interpolated sequence of residual error pictures, which is provided at the output of block 1012 and interpolated by an interpolator 1022. Again alternatively, the intermediate layer predictor can also provide a reconstructed base sequence of residual error pictures, as it is provided to an output 1024 of the base picture coder 1010. As can be seen from FIG. 1a, this reconstructed base sequence of residual error pictures can be interpolated 1022 or not interpolated 1020. Thus, generally, the intermediate layer predictor operates by using the base sequence of residual error pictures, wherein the information at the intermediate layer predictor input 1026 is derived, e.g. by a reconstruction or interpolation of the base sequence of residual error pictures at the output of block 1012.

Downstream to the intermediate layer predictor 1018, there is an enhancement picture coder 1028, which is formed to code the enhancement prediction residual error pictures to obtain the coded enhancement scaling layer 1004.

In a preferred embodiment of the present invention, the intermediate layer predictor is formed to subtract the signal at its output 1026 macroblock by macroblock and picture by picture from the respective signal, which the intermediate layer predictor 1018 obtains from the enhancement motion predictor 1016. The result signal obtained in this subtraction represents then a macroblock of a picture of the enhancement prediction residual error pictures.

In a preferred embodiment of the present invention, the intermediate layer predictor is formed adaptively. For every macroblock, an intermediate layer prediction flag 1030 is provided, which indicates the intermediate layer predictor that it has to perform a prediction, or which indicates in its other state that no prediction is to be performed, but that the corresponding macroblock at the output of the enhancement motion predictor 1016 is to be supplied to the enhancement picture coder 1028 without further prediction. This adaptive implementation has the advantage that an intermediate layer prediction is only performed where it is useful, where the prediction residual signal leads to a lower output picture rate compared to the case where no intermediate layer prediction has been performed, but where the output data of the enhancement motion predictor 1016 have been coded directly.

In the case of a spatial scalability, a decimator 1032 is provided between the enhancement scaling layer and the base scaling layer, which is formed to convert the video sequence at its input, which has a certain spatial resolution, to a video sequence at its output, which has a lower resolution. If a pure SNR scalability is intended, which means if the base picture coder 1010 and 1028 for the two scaling layers operate with different quantization parameters 1034 and 1036, respectively, the decimator 1032 is not provided. This is illustrated schematically in FIG. 1a by the bypass line 1038.

Further, in the case of spatial scalability, the interpolator 1022 has to be provided. In the case of a pure SNR scalability, the interpolator 1022 is not provided. Instead, the bypass line 1020 is taken, as illustrated in FIG. 1a.

In one implementation, the enhancement motion compensator 1014 is formed to fully calculate an individual motion field, or to use the motion field calculated by the base motion compensator 1006 directly (bypass line 1040) or after upsampling by an upsampler 1042. In the case of a spatial scalability, the upsampler 1042 has to be provided to upsample a motion vector of the base motion data to the higher resolution, which means, for example, to scale. If, for example, the enhancement resolution is twice as high and wide as the base resolution, a macroblock (16×16 luminance samples) in the enhancement layer covers a region of a picture, which corresponds to a sub-macroblock (8×8 luminance samples) in the base layer.

Thus, in order to be able to use the base motion vector for the macroblock of the enhancement scaling layer, the base motion vector is doubled in its x component and its y component, which means scaled by the factor 2. This will be discussed in more detail with reference to FIG. 6b.

If, however, there is merely an SNR scalability, the motion field is the same for all scaling layers. Thus, it has to be calculated only once and can be directly used by every higher scaling layer in the way it has been calculated by the lower scaling layer.

For intermediate layer prediction, the signal at the output of the base motion predictor 1012 can also be used. Alternatively, the reconstructed signal on line 1024 can be used. The selection, which of these two signals is used for prediction, is made by a switch 1044. The signal on line 1024 differs from the signal at the output of block 1012 by the fact that it has already experienced a quantization. This means that the signal on line 1024 has a quantization error in comparison to the signal at the output of block 1012. The alternative of using the signal on line 1024 for intermediate layer prediction is particularly advantageous when an SNR scalability is either used alone or in connection with a spatial scalability, since then the quantization error made by the base picture coder 1010 is then "taken along" to the higher scaling layer, since the output signal at block 1018 will then contain the quantization error made by the first scaling layer, which will then be quantized at the input 1036 by the enhancement picture coder with a typically finer quantizer step width and a changed quantization parameter 2, respectively, and will be written into the enhancement scaling layer 1004.

Analogous to the intermediate layer prediction flag 1030, a motion data flag 1048 is fed into the picture coder, so that a corresponding information about that is contained in the enhancement scaling layer 1004, which will then be used by the decoder, which will be discussed with reference to FIG. 2.

If a pure spatial scalability is used, the output signal of the base motion predictor 1012, which means the base sequence of residual error pictures, can be used instead of the signal on line 1024, which means instead of the reconstructed sequence of base residual error pictures.

Depending on the implementation, the control of this switch can take place manually or based on a prediction benefit function.

Here, it should be noted that preferably all predictions, which means the motion prediction, the enhancement motion data prediction and the intermediate layer residual value prediction are designed adaptively. This means that motion data prediction residual values do not necessarily have to be present for every macroblock or sub-macroblock in a picture of the base sequence of residual error pictures, for example. Thus, a picture of the base sequence of residual error pictures can also contain non-predicted macroblocks and sub-macroblocks, respectively, despite the fact that it is referred to as "residual error picture". This situation will occur when it has been found out that, e.g., a new object occurs in a picture. Here, a motion-compensated prediction would be useless, since the prediction residual signal would become larger than the original signal in the picture. In the enhancement motion prediction in block 1016, in such a case, both the prediction operator and eventually the update operator for this block (e.g. macroblock or sub-macroblock) would be deactivated.

Still, for clarity reasons, e.g. a base sequence of residual error pictures is mentioned, despite maybe only a single residual error picture of the base sequence of residual error pictures has a single block, which actually includes motion prediction residual signals. In typical application cases, however, every residual error picture will actually have a high number of blocks with motion prediction residual data.

In the sense of the present invention, this applies also for the enhancement sequence of residual error pictures. In that way, the situation in the enhancement layer will be similar to the situation in the base layer. Thus, in the sense of the present invention, an enhancement sequence of residual error pictures is already a sequence of pictures, wherein in the extreme case only a single block of a single "residual error picture" will have motion prediction residual values, while in all other blocks of this picture and even in all other "residual error pictures" actually no residual errors exist, since the motion-compensated prediction and, if necessary, the motion-compensated update have been deactivated for all these pictures/blocks.

According to the present invention, this applies also for the intermediate layer predictor, which calculates enhancement prediction residual error pictures. Typically, the enhancement prediction residual error pictures will be present in a sequence. However, the intermediate layer predictor is also preferably formed adaptively. If, for example, it has been found out that a residual data prediction of a base layer from the base layer to the enhancement layer has been useful only for a single block of a single "residual error picture", while for all other blocks of this picture and, if necessary, even for all other pictures of the sequence of enhancement prediction residual error pictures, the intermediate layer residual data prediction has been deactivated, in the present context, for clarity reasons, the sequence will still be referred to as enhancement prediction residual error picture. In this connection, it should be noted that the intermediate layer predictor can only predict residual data, when in a corresponding block of a residual error picture in the base layer motion compensation residual values have already been calculated, and when for a block corresponding to this block (e.g. at the same x, y position) a motion-compensated prediction has also been performed in a residual error picture of the enhancement sequence, so that in this block, residual error values exist in the enhancement layer due to a motion-compensated prediction. Only when actual motion-compensated prediction residual values exist in both blocks to be considered, the intermediate layer predictor will preferably become active to use a block of residual error values in a picture of the base layer as predictor for a block of residual error values in a picture of the enhancement layer and then to transmit only the residual values of this prediction, which means enhancement prediction residual error data in this block of the considered picture to the enhancement picture coder.

In the following, a detailed illustration of the base picture coder 1010 or the enhancement picture coder 1028 and any picture coder, respectively, will be discussed with reference to FIG. 1*b*. On the input side, the picture coder receives the group of residual error pictures and supplies them macroblock by macroblock to a transformation 1050. The transformed macroblocks will then be scaled in a block 1052 and quantized by using a quantization parameter 1034, 1036, . . . . At the output of block 1052, the used quantization parameter, which means the used quantizer step width for a macroblock as well as quantization indices for the spectral values of the macroblock, will be output. This information will then be supplied to an entropy coder stage not shown in FIG. 1*b*, which comprises a Huffman coder or preferably an arithmetic coder, which operates with the known CABAC concept according to H.264/AVC. The output signal of means 1052 will also be supplied to block 1054, which performs an inverse scaling and requantization to convert the quantization indices together with the quantization parameter again into numerical values, which will then be supplied to an inverse transformation in block 1056 to obtain a reconstructed group of residual error pictures, which will now have a quantization error at the input of the transformation block 1050 compared to the original group of residual error pictures, which depends on the quantization parameters and the quantizer step width, respectively. Depending on the control of the switch 1044, either the one signal or the other signal is supplied to the interpolator 1022 or already to the intermediate layer predictor 1018 in order to perform the inventive residual value prediction.

A simple implementation of the intermediate layer predictor flag 1030 is illustrated in FIG. 1c. If the intermediate layer prediction flag is set, the intermediate layer predictor 1018 is activated. However, if the flag is not set, the intermediate layer predictor is deactivated, so that a simulcast operation is performed for this macroblock or a sub-macroblock subordinate to this macroblock. The reason therefore could be that the coder gain by the prediction is actually a coder loss, which means that a transmission of the corresponding macroblock at the output of block 1016 provides a better coder gain in the subsequent entropy coding than when prediction residual values would be used.

A simple implementation of the motion data flag 1048 is shown in FIG. 1d. If the flag is set, motion data of the enhancement layer are derived from upsampled motion data of the base layer. In the case of an SNR scalability, the upsampler 1042 is not required. Here, when the flag 1048 is set, the motion data of the enhancement layer can be derived directly from the base motion data. It should be noted that this motion data "derivation" can be the direct takeover of the motion data or a real prediction wherein block 1014 subtracts the motion vectors obtained from the base layer from corresponding motion vectors for the enhancement scaling layer calculated by block 1014, to obtain motion data prediction values. The motion data of the enhancement layer (if no prediction of any type has been performed) or the residual values of the prediction (if a real prediction has been performed) will be supplied to the enhancement picture coder 1028 via an output shown in FIG. 1a, so that they will be contained in the enhancement scaling layer bit stream 1004 in the end. If, however, a full take over of the motion data from the base scaling layer with or without scaling is performed, no enhancement motion data have to be written into the enhancement scaling layer bit stream 1004. It is merely sufficient to signalize this fact by the motion data flag 1048 in the enhancement scaling layer bit stream.

FIG. 2 shows an apparatus for decoding a coded video sequence, which comprises the base scaling layer 1002 and the enhancement scaling layer 1004. The enhancement scaling layer 1004 and the base scaling layer 1002 can originate from a bit stream demultiplexer, which demultiplexes a scalable bit stream with both scaling layers correspondingly, to extract both the base scaling layer 1002 and the enhancement scaling layer 1004 from the common bit stream. The base scaling layer 1002 is supplied to a base picture decoder 1060, which is formed to decode the base scaling layer to obtain a decoded base sequence of residual error pictures and base motion data, which are applied to an output line 1062. The output signals at line 1062 will then be supplied to a base motion combiner 1064, which cancels the base motion predictor introduced in the coder in block 1012, to output decoded pictures of the first scaling layer on the output side. Further, the inventive decoder comprises an enhancement picture decoder 1066 for decoding the enhancement scaling layer 1004 to obtain enhancement prediction residual error pictures at an output line 1068. Further, the output line 1068 comprises motion data information, such as the motion data flag 1070 or, if actually enhancement motion data or enhancement motion data residual values existed in the enhancement scaling layer 1004, these enhancement motion data. Now, the decoded base sequence on the line 1062 will either be interpolated by an interpolator 1070 or supplied unchanged (line 1072) to an intermediate layer combiner 1074 in order to cancel the intermediate layer prediction performed by the intermediate layer predictor 1018 of FIG. 1a. Thus, the intermediate layer combiner is formed to combine the enhancement prediction residual error pictures with information about the decoded base sequence on line 1062, either interpolated (1070) or not (1072), to obtain an enhancement sequence of residual error pictures, which will finally be provided to an enhancement motion combiner 1076, which, like the base motion combiner 1064, cancels the motion compensation performed in the enhancement layer. The enhancement motion combiner 1076 is coupled to a motion data determination means 1078, to provide the motion data for the motion combination in block 1076. The motion data can actually be full enhancement motion data for the enhancement layer provided by the enhancement picture decoder at output 1068. Alternatively, the enhancement motion data can also be motion data residual values. In both cases, the corresponding data will be supplied to the motion data determination means 1078 via an enhancement motion data line 1080. If, however, the motion data flag 1070 signals that no individual enhancement motion data have been transmitted for the enhancement layer, necessary motion data will be taken from the base layer via a line 1082, depending on the used scalability either directly (line 1084) or after upsampling by an upsampler 1086.

Further, in the case of an intermediate layer prediction of intrablocks, which means no motion data residual values, a corresponding connection between the enhancement motion combiner 1076 and the base motion combiner 1064 is provided on the decoder side, which has, depending on spatial scalability, an interpolator 1090 or a bypass line when only an SNR scalability has been used. In the case of an optional intrablock prediction between two layers, merely a prediction residual signal will be transmitted to the enhancement layer for this intramacroblock, which will be indicated by corresponding signalization information in bit stream. In this case, the enhancement motion combiner will also perform a summation for this one macroblock, additionally to the below explained functionality, which means to perform a combination between the macroblock residual values and the macroblock values from the lower scaling layer and to supply the obtained macroblock to the actual inverse motion compensation processing.

In the following, with reference to FIGS. 3 to 5d, a preferred embodiment of the base motion predictor 1012 or the enhancement motion predictor 1016 and the inverse element, respectively, which means the enhancement motion combiner 1076 or the base motion compensator 1064 will be explained.

Figure 4:
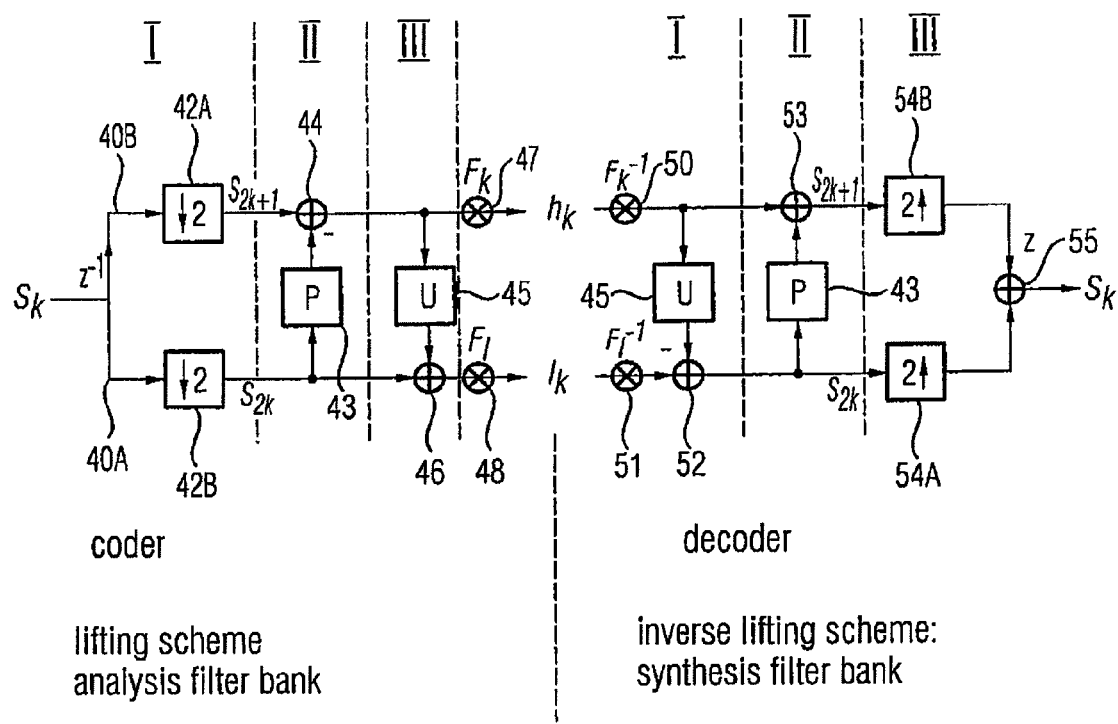
FIG. 4 is a block diagram for illustrating the lifting decomposition of a time subband filter bank.
Figure 9:
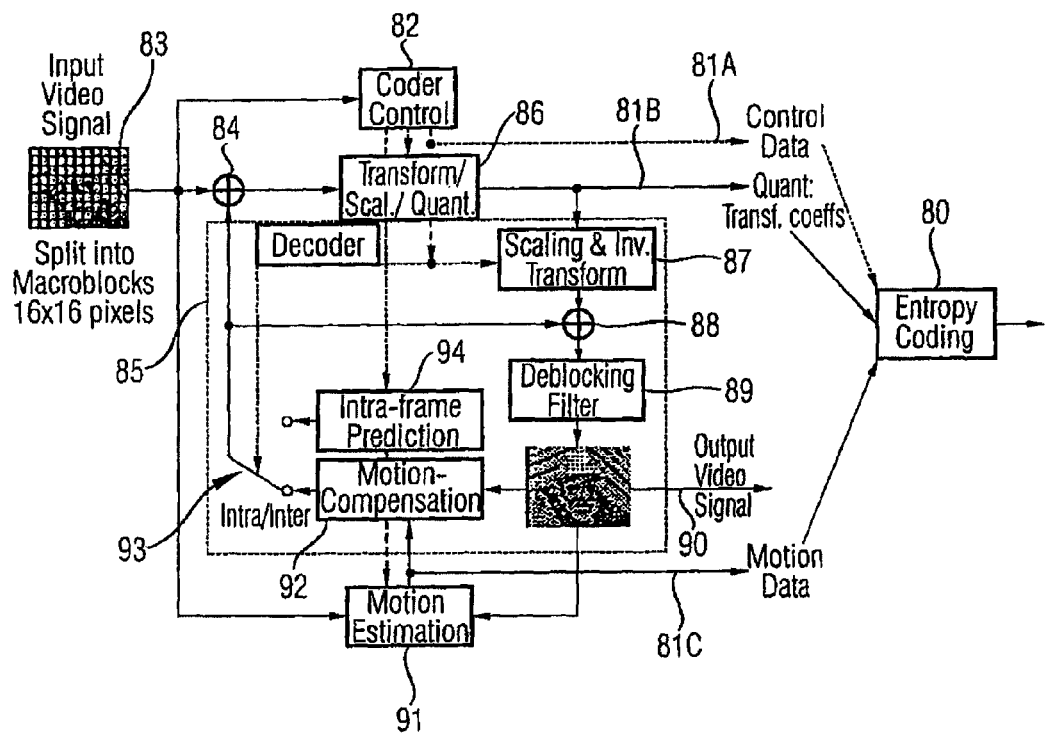
FIG. 9 is an overview block diagram for illustrating the basic coder structure for a coder according to the standard H.264/AVC for a macroblock.
Figure 10:
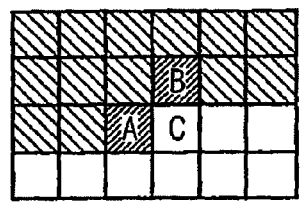
FIG. 10 is a context arrangement consisting of two adjacent pixel elements A and B on the left and above a current syntax element C, respectively.
Figure 11:
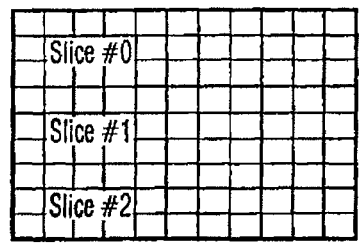
FIG. 11 is a representation of the partition of a picture into slices.

Basically, any motion-compensated prediction algorithm can be used, which means also the motion compensation algorithm illustrated at 92 in FIG. 9. Thus, the conventional motion compensation algorithm also follows the systematic shown in FIG. 1, wherein, however, the update operator U illustrated in FIG. 4 with reference number 45, is deactivated. This leads to the fact that a group of pictures is converted into an original picture and residual pictures and prediction residual signals, respectively, or residual error pictures depending thereon. If, however, an enhancement is implemented in the known motion compensation scheme in that the update operator, as illustrated in FIG. 4, is active and is calculated, for example as it is illustrated with regard to FIGS. 5a to 5d, the normal motion-compensated prediction calculation becomes the so-called MCTF processing, which is also referred to as motion-compensated time filtering. Here, the normal picture and intra picture of the conventional motion compensation, respectively, becomes a low-pass picture through the update operation, since the original picture combined with the prediction residual signal weighted by the update operator.

As has already been described with regard to FIGS. 1a and 2, in a preferred embodiment of the present invention, such an MCTF processing is performed for every scaling layer, wherein the MCTF processing is preferably performed as it is described with reference to FIGS. 3 to 5d and 7 to 8.

In the following, the preferred embodiment of the motion-compensated prediction filter will be described with reference to FIG. 4 and the subsequent FIGS. 5a-5d. As has already been explained, the motion-compensated temporal filter (MCTF) consists of a general lifting scheme with three steps, namely the polyphase decomposition, the prediction and the update. The corresponding analysis/synthesis filter bank structure is shown in FIG. 4. On the analysis side, the odd samples of a given signal are filtered by a linear combination of the even samples by using the prediction operator P and the high-pass signal H to the prediction residual values. A corresponding low-pass signal 1 is formed by adding a linear combination of the prediction residual values h with the even samples of the input signal s by using the update operator. The equation connection of the variables h and l shown in FIG. 4 as well as the basic embodiments of the operators P and U is shown in FIG. 5a.

Since both the prediction step and the update step can be fully inverted, the corresponding transformation can be considered as critically sampled perfect reconstruction filter bank. The synthesis filter bank comprises the application of the prediction operator and the update operator in inverse sequence with the inverted signs in the summation process, wherein the even and odd polyphase components are used. For a normalization of the high-pass/low-pass components, corresponding scaling factors $F_l$ and $F_h$ are used. These scaling factors do not necessarily have to be used, but they can be used when quantizer step sizes are chosen during coding.

f[x,k] shows a video signal with the space coordinates $x=(x,y)^T$, wherein k is the time coordinate. The prediction operator P and the update operator U for the temporal decomposition by using the lifting representation of the hair wavelet is given as shown on the left hand side in FIG. 5b. For the 5/3 transformation, corresponding operators result as shown on the right hand side in FIG. 5b. The enhancement to the motion-compensated temporal filtering is obtained by modification of the prediction operator and the update operator, as shown in FIG. 5c. Particularly, reference will be made to the reference indices r>0, which allow a general picture adaptive motion-compensated filtering. Through these reference indices, it can be ensured that in the scenario illustrated in FIG. 4 not only merely two temporally immediately subsequent pictures are decomposed into a high-pass picture and a low-pass picture, but that, for example, a first picture can be filtered in a motion compensated way with a third picture of a sequence. Alternatively, the appropriate choice of reference indices allows that, e.g., one and the same picture of a sequence of sequences can be used to serve as base for the motion vector. This means that the reference indices allow for example in a sequence of eight pictures that all motion vectors are related, e.g. to the fourth picture of the sequence, so that a single low-pass picture results at the end by processing these eight pictures through the filter scheme in FIG. 4, and that seven high-pass pictures (enhancement pictures) result and that all motion vectors relate to one and the same picture of the original sequence where one enhancement picture is associated to every motion vector.

If thus one and the same picture of a sequence is used as reference for filtering several further pictures, this leads to a temporal resolution scaling not obeying to the factor of 2, which can be advantageous for certain applications. Always the same picture, namely, for example, the fourth picture of the sequence of eight pictures, is fed into the lower branch of the analysis filter bank in FIG. 4. The low-pass picture is the same in every filtering, namely the finally desired single low-pass picture of the sequence of pictures. When the update parameter is zero, the base picture is simply "passed through" through the lower branch. In comparison, the high-pass picture is always dependent on the corresponding other picture of the original sequence and the prediction operator, wherein the motion vector associated to this input picture is used in the prediction. Thus, in this case it can be said that the finally obtained low-pass picture is associated to a certain picture of the original sequence of pictures, and that also every high-pass picture is associated to a picture of the original sequence, wherein exactly the deviation of the original picture correspond to the sequence (a motion compensation) from the chosen base picture of the sequence (which is fed into the lower branch of the analysis filter bank of FIG. 4). When every update parameter $M_{01}$, $M_{11}$, $M_{21}$ and $M_{31}$ is equal to zero, this leads to the fact that the picture fed into the lower branch 73 of the fourth level is simply "passed through" towards the bottom. In a way, the low-pass picture TP1 is fed "repeatedly" into the filter bank, while the other pictures—controlled by the reference indices—are introduced one after the other into the input 64 of FIG. 3.

As can be seen from the previous equations, the prediction and update operators for the motion-compensated filtering, respectively, provide different predictions for the two different wavelets. When the hair wavelet is used, a unidirectional motion-compensated prediction is achieved. If, however, the 5/3 spline wavelet is used, the two operators specify a bidirectional motion-compensated prediction.

Since the bidirectional compensated prediction generally reduces the energy of the prediction residual value, but increases the motion vector rate compared to an unidirectional prediction, it is desirable to switch dynamically between the unidirectional and the bidirectional prediction, which means that one can switch between a lifting representation of the hair wavelet and the 5/3 spline wavelet dependent on a picture dependent control signal. The inventive concept, which uses no closed feedback loop for temporal filtering, easily allows this macroblock by macroblock switching between two wavelets, which again supports flexibility and particularly data rate saving, which can be performed optimally in a signal-adapted way.

In order to represent the motion fields or generally the prediction data fields $M_p$ and $M_u$, ideally, the existing syntax of the B slices in H.264/AVC can be used.

Figure 7:
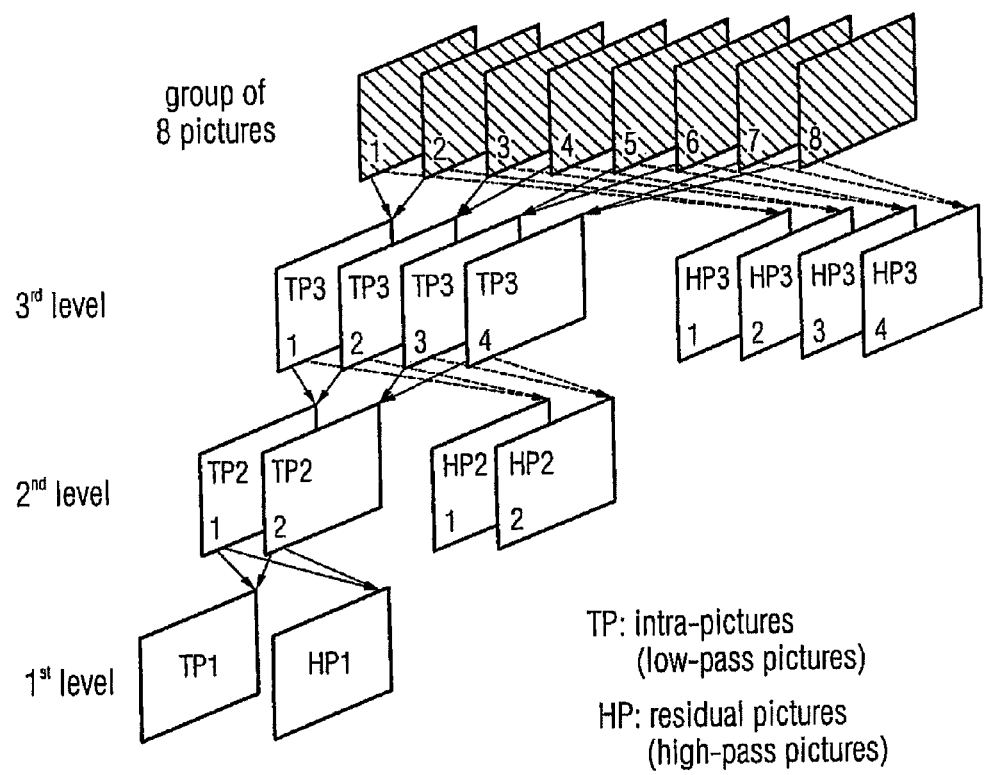
FIG. 7 is an overview diagram for illustrating the time shift of a group of, for example, 8 pictures.

By cascading the pair-wise picture decomposition stages, a dyadic tree structure is obtained, which decomposits a group of $2^n$ pictures into $2^n-1$ residual pictures and a single low-pass (or intra) picture, as it is illustrated with regard to FIG. 7 for a group of eight pictures. Particularly, FIG. 7 shows the first-level high-pass picture HP1 at the output 22 of the filter of the first level as well as the first-level low-pass picture at the output 24 of the first-level filter. The two low-pass pictures TP2 at the output 16 of the second-level filter as well as the high-pass pictures obtained from the second level are shown in FIG. 7 as second level pictures. The third level low-pass pictures are applied to the output 76 of the third level filter, while the third level high-pass pictures are applied to the output 75 in processed form.

The group of eight pictures could originally comprise eight video pictures, wherein then the decoder of FIG. 3 would be used without fourth filter level. If, however, the group of eight pictures is a group of eight low-pass pictures, as they are used at the output 73 of the fourth level filter, the inventive MCTF decomposition can be used as base motion predictor, enhancement motion predictor and as base motion combiner or enhancement motion combiner, respectively.

Thus, generally, in this decomposition a group of $2^n$ pictures, $(2^{n+1-2})$ motion field descriptions, $(2^{n-1})$ residual pictures as well as a single low-pass (or intra) picture are transmitted.

Both the base motion compensator and the enhancement motion compensator are preferably controlled by a base control parameter and an enhancement control parameter, respectively, to calculate an optimum combination of a quantization parameter (1034 or 1036) and motion information, which is fixed in dependence on a certain rate. This is performed according to the following method to obtain an optimum ratio with regard to a certain maximum bit rate. Thus, it has been found out that for lower bit rates, which means relatively coarse quantization parameters, the motion vectors count more than for higher scaling layers, where relatively fine quantization parameters are taken. Thus, for cases of coarse quantizing and thus lower bit rate, less motion data are calculated than for higher scaling layers. Thus, it is preferred in higher scaling layers to move to sub-macroblock modes to calculate rather a lot of motion data for a good quality and for an optimum situation in the high bit rate, than in the case of a lower bit rate, where the motion data proportionally count more with regard to the residual data than in the case of a higher scaling layer. This will be discussed below.

Pictures A and B are given, which are either original pictures or pictures representing low-pass signals, which are generated in a previous analysis stage. Further, the corresponding arrays of luma samples a[ ] and b[ ] are provided. The motion description $M_{i0}$ is estimated in a macroblock by macroblock way as follows:

For all possible macroblock and sub-macroblock partitions of a macroblock i within a picture B, the associated motion vectors $$m_i = [m_x, m_y]^T$$

are determined by minimizing the Lagrange function $$m_i = \mathrm{arg\,min}_{m \in S} \{D_{SAD}(i, m) + \lambda \cdot R(i, m)\},$$

wherein the deterioration term is given as follows:

$$D_{SAD}(i, m) = \sum_{(x,y) \in P} |b[x, y] - a[x - m_x, y - m_y]|$$

Here, S specifies the motion vector search region within the reference picture A. P is the region covered by the considered macroblock partition or sub-macroblock. partition. R(i,m) specifies the number of bits, which are required to transmit all components of the motion vector m, wherein λ is a fixed Lagrange multiplier.

First, the motion search proceeds across all integer sample exact motion vectors in the given search region S. Then, by using the best integer motion vector, the eight surrounding half sample exact motion vectors are tested. Finally, by using the best half sample exact motion vector, the eight surrounding quarter sample exact motion vectors are tested. For the half and quarter half exact motion vector improvement, the term $$a[x-m_x, y-m_y]$$

is interpreted as interpolation operator.

Generally, the mode decision for the macroblock mode and the sub-macroblock mode follows the same approach. The mode $p_i$, which minimizes the following Lagrange function, is chosen from a given set of possible macroblock or sub-macroblock modes $S_{mode}$:

$$p_i = \mathrm{arg\,min}_{p \in S_{mode}} \{D_{SAD}(i, p) + \lambda \cdot R(i, p)\}$$

The deterioration term is given as follows:

$$D_{SAD}(i, p) = \sum_{(x,y) \in P} |b[x, y] - a[x - m_x[p, x, y], y - m_y[p, x, y]]|$$

wherein P specifies the macroblock or sub-macroblock region, and wherein m[p, x, y] is the motion vector which is associated to the macroblock or sub-macroblock mode p and the partition or sub-macroblock partition, which comprises the luma position (x,y).

The rate term R(i,p) represents the number of bits, which are associated to the choice of the coder mode p. For the motion compensated coder modes, the same comprises the bits for the macroblock mode (if applicable), the sub-macroblock mode and modes (if applicable), respectively, and the motion vector and vectors, respectively. For the intra mode, the same comprises the bits for the macroblock mode and the arrays of quantized luma and chroma transformation coefficient levels.

The set of possible sub-macroblock modes is given by

{$P\_8 \times 8, P\_8 \times 4, P\_4 \times 8, P\_4 \times 4$}.

The set of possible macroblock modes is given by

{$P\_16 \times 16, P\_16 \times 8, P\_8 \times 16, P\_8 \times 8$, INTRA}, wherein the INTRA mode is only used when a motion field description $M_{i0}$ used for the prediction step is estimated.

The Lagrange multiplier λ is set according to the following equation in dependence on the base layer quantization parameter for the high-pass picture or pictures $QP_{Hi}$ of the decomposition stage, for which the motion field is estimated:

$$\lambda = 0.33 \cdot 2^{(QP_{Hi}/3-4)}$$

Figure 8:
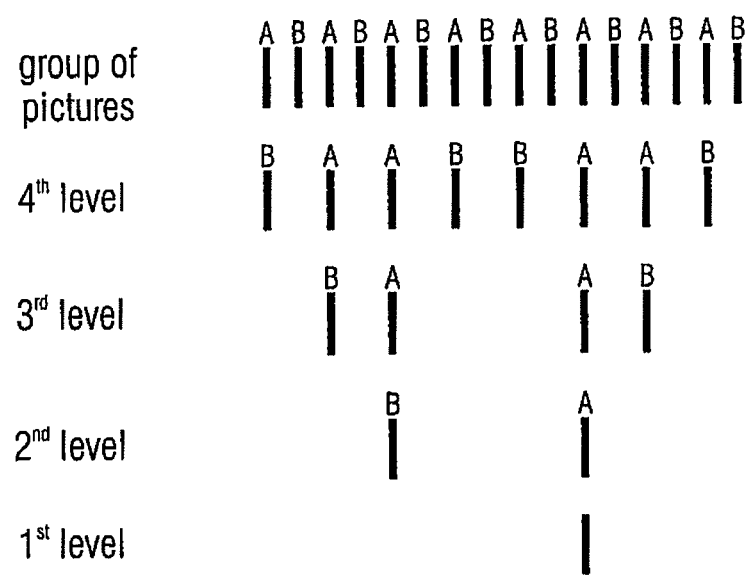
FIG. 8 is a preferred time placement of low-pass pictures for a group of 16 pictures.

According to the invention, the decomposition scheme shown in FIG. 8 is used, which is assumed to enable a sensible compromise between temporal scalability and coder efficiency. The sequence of the original pictures is treated as sequence of input pictures A, B, A, B, A, B, A, B. Thus, this scheme provides a stage with optimum temporal scalability (equal distance between the low-pass pictures). The sequence of low-pass pictures, which are used as input signal to all following decomposition stages, are treated as sequences of input pictures B, A, A, B, B, A . . . A, B, whereby the spaces between the low-pass pictures which are decomposed, are kept small in the following two channel analysis scheme, as can be seen in FIG. 8.

In the following, reference will be made to preferred implementations of both the motion data intermediate layer prediction and the residual data intermediate layer prediction with regard to FIGS. 6a to 6d. To obtain a spatial and an SNR scalability, respectively, basically, motion data and texture data of a lower scaling layer are used for prediction purposes for a higher scaling layer. Here, particularly in the spatial scalability, an upsampling of the motion data will be required, before they can be used as prediction for the decoding of spatial enhancement layers. The motion prediction data of a base layer representation are transmitted by using a subset of the existing B slice syntax of AVC. Preferably, two additional macroblock modes are introduced for coding the motion field of an enhancement layer.

The first macroblock mode is "base_layer_mode" and the second mode is the "qpel_refinement_mode". For signalizing these two additional macroblock modes, two flags, namely the BLFlag and the QrefFlag are added to the macroblock layer syntax, prior to the syntax element mb_mode, as shown in FIG. 1. Thus, the first flag BLFlag 1098 signalizes the base layer mode, while the other flag 1100 symbolizes the qpel refinement mode. If such a flag is set, it has the value 1, and the data stream is as shown in FIG. 6a. Thus, if the flag 1098 has the value 1, the flag 1100 and the syntax element macroblock mode 1102 have no further importance. If, however, the flag 1098 has the value zero, it is not set, and the flag 1100 will be used, which, when it is set, again bridges the element 1102. If, however, both flags 1098 and 1100 have a value zero, which means they are both not set, the macroblock mode will be evaluated in the syntax element 1102.

When BLFlag=1, the base layer mode is used, and no further information is used for the corresponding macroblock. This macroblock mode indicates that the motion prediction information including the macroblock partition of the corresponding macroblock of the base layer is directly used in that way for the enhancement layer. It should be noted that here and in the whole specification, the term "base layer" is to represent a next lower layer with regard to the currently considered layer, which means the enhancement layer. When the base layer represents a layer with half the spatial resolution, the motion vector field, which means the field of motion vectors including the macroblock partition is scaled correspondingly, as it is illustrated in FIG. 6b. In this case, the current macroblock comprises the same region as an 8×8 sub-macroblock of the base layer motion field. Thus, if the corresponding base layer macroblock is coded in a direct, 16×16, 16×8 or 8×16 mode, or when the corresponding base layer sub-macroblock is coded in the 8×8 mode or in the direct 8×8 mode, the 16×16 mode is used for the current macroblock. If, on the other hand, the base layer sub-macroblock is coded in the 8×4, 4×8 or 4×4 mode, the macroblock mode for the current macroblock=16×8, 8×16 or 8×8 (with all sub-macroblock modes=8×8). When the base layer macroblock represents an INTRA_macroblock, the current macroblock is set to INTRA BASE, which means that it is a macroblock with a prediction from the base layer. For the macroblock partitions of the current macroblock, the same reference indices are used as for the corresponding macroblock/sub-macroblock partitions of the base layer block. The associated motion vectors are multiplied by a factor of 2. This factor applies for the situation shown in FIG. 6b, where a base layer 1102 comprises half the region and number of pixels, respectively, than the enhancement layer 1104. If the ratio of the spatial resolution of the base layer to the spatial resolution of the enhancement layer is unequal to ½, corresponding scaling factors are used for the motion vector.

If, however, the flag 1098 equals zero and flag 1100 equals 1, macroblock mode qpel_refinement_mode is signalized. The flag 1100 is preferably only present when the base layer represents a layer with half the spatial resolution of the current layer. Otherwise, the macroblock mode (qpel_refinement_mode) is not contained in the set of possible macroblock modes. This macroblock mode is similar to the base layer mode. The macroblock partition as well as the reference indices and the motion vectors are derived as in the base layer mode. However, for every motion vector, there is an additional quarter sample motion vector refinement −1.0 or +1 for every motion vector component, which is transmitted additionally and added to the derived motion vector.

When the flag 1098=zero and the flag 1100=zero, or when the flag 1100 is not present, the macroblock mode as well as the corresponding reference indices and motion vector differences are specified as usual. This means that the complete set of motion data is transmitted for the enhancement layer the same way as for the base layer. However, according to the invention, the possibility is provided to use the base layer motion vector as predictor for the current enhancement layer motion vector (instead of the spatial motion vector predictor). Thus, the list X (wherein X lies between 0 and 1) is to specify the reference index list of the considered motion vector. If all subsequent conditions are true, a flag MvPrdFlag is transmitted, as shown in FIG. 6c, for every motion vector difference:

the base layer macroblock comprising the current macroblock/sub-macroblock partitions is not coded in an INTRA macroblock mode;

the base layer macroblock/sub-macroblock partition covering the upper left sample of the current macroblock/sub-macroblock partition uses the list X or a bipredicition;

the list X reference index of the base layer macroblock/sub-macroblock partition, which comprises the upper left sample of the current macroblock/sub-macroblock partition is equal to the list X reference index of the current macroblock/sub-macroblock partition.

If the flag 1106 of FIG. 6c is not present, or if this flag 1106=zero, the spatial motion vector predictor is specified as it is the case in the standard AVC. Otherwise, when the flag 1106 is present and =1, the corresponding base layer vector is used as motion vector predictor. In this case, the list X motion vector (wherein X=0 or 1) of the current macroblock/sub-macroblock partition is obtained by adding the transmitted list X motion vector difference to the possibly scaled list X motion vector of the base layer macroblock/sub-macroblock partition.

Thus, the flags 1098, 1100 and 1106 represent together a possibility to implement the motion data flag 1048 generally indicated in FIG. 1a and generally a motion data control signal 1048, respectively. There are, of course, different other possibilities of signalizing, wherein naturally a fixed agreement between transmitter and receiver can be used, which allows a reduction of signalizing information.

In summary, a detailed implementation of the enhancement motion compensator 1014 of FIG. 1a and the enhancement motion data determination means 1078 of FIG. 2, respectively, is illustrated in more detail with regard to FIGS. 1e, 1f and 1g.

With reference to FIG. 1e, it can be seen that the enhancement motion compensator 1014 basically has to do two things. Thus, it first has to calculate the enhancement motion data, typically the whole motion vectors and supply them to the enhancement motion predictor 1016, so that the same can use these vectors in uncoded form to obtain the enhancement sequence of residual error pictures which are, in the prior art, typically performed adaptively and block by block. Another matter, however, is the enhancement motion data processing, which means how the motion data used for a motion-compensated prediction will now be compressed as much as possible and written into a bit stream. In order for something to be written into the bit stream, respective data have to be brought to the enhancement picture coder 1028, as it is illustrated with regard to FIG. 1e. Thus, the enhancement motion data processing means 1014b has the function to reduce the redundancy contained in the enhancement motion data, which the enhancement motion data calculation means 1014a has determined, with regard to the base layer as much as possible.

According to the invention, the base motion data or the upsampled base motion data can be used both by the enhancement motion data calculation means 1014a for calculating the actually to be used enhancement motion data or can also be used only for enhancement motion data processing, which means for enhancement motion data compression, while they are of no importance for the calculation of the enhancement motion data. While the two possibilities 1.) and 2.) of FIG. 1g show embodiments where the base motion data and the upsampled base motion data are already used in the enhancement motion data calculation, the embodiment 3.) of FIG. 1b shows a case where information about the base motion data are not used for calculating the enhancement motion data but merely for coding and capture of residual data, respectively.

FIG. 1f shows the decoder side implementation of the enhancement motion data determination means 1078, which has a control module 1078a for block by block control, which contains the signalizing information from the bit stream and from the enhancement picture decoder 1066, respectively. Further, the enhancement motion data determination means 1078 comprises an enhancement motion data reconstruction means 1078b, which actually determines the motion vectors of the enhancement motion data field, either only by using the decoded base motion data or decoded upsampling base motion data or by combining information about the decoded base motion data and from the residual data extracted from the enhancement motion decoder 1066 from the enhancement scaling layer 1004, which can then be used by the enhancement motion combiner 1076, which can be formed as common combiner to reverse the coder side motion-compensated prediction.

In the following, reference will be made to the different embodiments as they are illustrated in FIG. 1g in overview. As has already been illustrated with regard to FIG. 6a, the BLFlag 1098 signalizes a complete takeover of the upscaled base motion data for the enhancement motion prediction. In that case, means 1014a is formed to completely take over the base motion data and in the case of different resolutions of the different layers, to take over the motion data in upscaled form and transmit them to means 1016, respectively. However, no information about motion fields or motion vectors is transmitted to the enhancement picture coder. Instead, merely an individual flag 1098 is transmitted for every block, either macroblock or a sub-macroblock.

On the decoder side, this means that means 1078a of FIG. 1f decodes the flag 1098 for one block and, if it was active, uses the decoded base motion data present from the base layer or the decoded upsampled base motion data to calculate the enhancement motion data, which are then supplied to block 1076. In this case, the means 1078 requires no motion vector residual data.

In the second embodiment of the present invention, which is signalized by the flag QrefFlag 1100, the base motion vector is integrated into the enhancement motion data calculation, which is performed by means 1014a. As it is illustrated in FIG. 1g in portion 2.) and described above, the motion data calculation and the calculation of the motion vector m, respectively, is performed by searching the minimum of the term (D+λR).

The difference between a block of a current picture B and a block of a previous and/or later picture shifted by a certain potential motion vector is introduced into the distortion term D. The quantization parameter of the enhancement picture coder indicated in FIG. 1a by 1036 is introduced into the factor λ. The term R provides information about the number of bits used for coding a potential motion vector.

Normally, a search is performed among different potential motion vectors, wherein the distortion term D is calculated for every new motion vector, and the rate term R is calculated, and wherein the enhancement quantization parameter 1036, which is preferably fixed, but could also vary, is considered. The described sum term is evaluated for different potential motion vectors, whereupon the motion vector is used, which provides the minimum result of the sum.

Now, according to the invention, the base motion vector of the corresponding block from the base layer is also integrated into this iterative search. If it fulfills the search criteria, again merely the flag 1100 has to be transmitted, but no residual values or anything else for this block has to be transmitted. Thus, when the base motion vector fulfills the criterion (minimum of the previous term) for a block, means 1014a uses the base motion vector in order to transmit it to means 1016. However, merely the flag 1100 is transmitted to the enhancement picture coder.

On the decoder side, this means that the means 1078a controls the means 1078b when it decodes the flag 1100 to determine the motion vector for this block from the base motion data, since the enhancement picture decoder has transmitted no residual data.

In a variation of the second embodiment, not only the base motion vector but also a plurality of base motion vectors derived from the base motion vector and (slightly) altered are integrated into the search. Depending on the implementation, any component of the motion vector can be independently increased or decreased by one increment, or be left the same. This increment can represent a certain granularity of a motion vector, e.g. a resolution step, a half resolution step or a quarter resolution step. If such an altered base motion vector fulfills the search criteria, the alteration, which means the increment, which means +1, 0 or −1 is transmitted as "residual data", additionally to the flag 1100.

Activated by flag 1100, a decoder will then search for the increment in the data stream and further recover the base motion vector or the upsampled base motion vector and combine the increment with the corresponding base motion vector in block 1078b, to obtain the motion vector for the corresponding block in the enhancement layer.

In the third embodiment, which is signalized by the flag 1106, the determination of the motion vectors can basically be performed arbitrarily. With regard to the full flexibility, the means 1014a can determine the enhancement motion data e.g. according to the minimization object mentioned in connection with the second embodiment. Then, the determined motion vector is used for coder side motion-compensated prediction, without considering information from the base layer. However, in that case, the enhancement motion data processing 1014a is formed to incorporate the base motion vectors into the motion vector processing for redundancy reduction, which means prior to the actual arithmetic coding.

Thus, according to the standard H.264/AVC, a transmission of motion vector differences is performed, wherein differences between adjacent blocks are determined within a picture. In the implementation, the difference can be formed between different adjacent blocks, to select then the smallest difference. Now, according to the invention, the base motion vector for the corresponding block in a picture is incorporated into this search for the most favorable predictor for the motion vector difference. If it fulfills the criterion that it provides the smallest residual error value as predictor, this is signalized by the flag 1106 and merely the residual error value is transmitted to block 1028. If the base motion vector does not fulfill this criterion, the flag 1106 is not set, and a spatial motion vector difference calculation is performed.

For simpler coder implementations, however, instead of the iterative search, simply always and for adaptively determined blocks the base motion vector, respectively, and an upsampled version of the same, respectively, can serve as predictor.

According to the invention, an intermediate layer prediction of residual data will also be performed. This will be discussed below. When the motion information is changed from one layer to the next, it can be favorable or unfavorable to predict residual information and, in the case of a MCTF decomposition, high-pass information of the enhancement layer, respectively, from the base layer. When the motion vectors for a block of the current layer are similar to the motion vectors of the corresponding base layer and macroblock by macroblock to corresponding motion vectors of the corresponding base layer, it is likely that the coder efficiency can be increased when the coded base layer residual signal (high-pass signal) is used as prediction for the enhancement residual signal (enhancement high-pass signal), whereby only the difference between the enhancement residual signal and the base layer reconstruction (line 1024 of FIG. 1a) is coded. However, when the motion vectors are not similar, it is very unlikely that a prediction of the residual signal will improve the coder efficiency. Consequently, an adaptive approach is used for the prediction of the residual signal and high-pass signal, respectively. This adaptive approach, which means whether the intermediate layer predictor is active or not, can be performed by an actual calculation of the benefit based on the difference signal or can be performed based on an estimation, how different the motion vector of a base scaling layer for a macroblock is to a corresponding macroblock in the enhancement scaling layer. If the difference is smaller than a certain threshold, the intermediate layer predictor is activated via the control line 130. However, if the difference is higher than a certain threshold, the intermediate layer predictor for this macroblock is deactivated.

A flag ResPrdFlag 1108 is transmitted. When the flag 1108=1, the reconstructed residual signal of the base layer is used as prediction for the residual signal of the current macroblock of the enhancement layer, wherein only an approximation of the difference between the current residual signal of the enhancement layer and its base layer reconstruction will be coded. Otherwise, the flag 1108 does not exist or equals zero. Here, the residual signal of the current macroblock in the enhancement layer will then be coded without prediction from the base layer.

When the base layer represents a layer with half the spatial resolution of the enhancement layer, the residual signal is upsampled by using an interpolation filter, before the upsampled residual signal of the base layer is used as prediction signal. This filter is an interpolation filter with six taps, such that for interpolating a value of the higher spatial resolution of the enhancement layer, which was not present in the base layer due to the lower resolution, values from the surroundings are used to obtain an interpolation result, which is as good as possible.

If, however, values at the edge of a transformation block are interpolated, and the interpolation filter would use only values of another transformation block for interpolation, it is preferred not to do this, but to synthesize the values of the interpolation filter outside the considered block so that an interpolation with as little artifacts as possible takes place.

Based on a so-called core experiment, it was found out that the intermediate layer prediction of motion and residual values significantly improves the coder efficiency of the AVC based MCTF approach. For certain test points, PSNR gains of more than 1 dB were obtained. Particularly with very low bit rates for every spatial resolution (with the exception of the base layer), the improvement of the reconstruction quality was clearly visible.

Depending on the circumstances, the inventive method can be implemented in hardware or in software. The implementation can be performed on a digital storage medium, particularly a disc or CD with electronically readable control signals, which can cooperate with a programmable computer system such that the method is performed. Thus, generally, the invention consist also in a computer program product with a program code for performing the inventive method stored on a machine readable carrier, when the computer program product runs on a computer. In other words, the invention can also be realized as computer program with a program code for performing the method when the computer program runs on a computer.

Further, the present invention concerns a computer readable medium, whereon a scalable data stream with a first scaling layer and a second scaling layer together with the associated control characters are stored for the different decoder-side means. Thus, the computer readable medium can be a data carrier or the internet whereon a data stream is transmitted from a provider to a receiver.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for generating a coded video sequence having a base scaling layer and enhancement scaling layer, comprising:
   a base motion compensator configured for calculating base motion data, which indicate how a block in a current picture has moved in relation to another picture in a group of pictures;
   a base motion predictor configured for calculating a base sequence of residual error pictures by using the base motion data;
   a base picture coder configured to generate a coded first scaling layer from the base sequence of residual error pictures;
   an enhancement motion compensator configured for determining enhancement motion data,
   wherein the enhancement motion compensator is formed to determine enhancement motion data adaptively and block by block by using the base motion data and to provide signalization information block by block,
   wherein the signalization information indicates, for each block, whether an enhancement motion data prediction has been performed at all by using the base motion data and of what type the enhancement motion data prediction is,
   wherein the signalization information is associated to each block,
   wherein the signalization information have a first state for a first block of the coded video sequence, the signalization information having a second state for a second block of the coded video sequence, the second block being different from the first block;
an enhancement motion predictor for calculating an enhancement sequence of residual error pictures by using the enhancement motion data; and
an enhancement picture coder for coding information about the enhancement sequence of residual error pictures and for coding the signalization information block by block to obtain a coded enhancement scaling layer,
wherein the coded video sequence comprises the coded base scaling layer and the coded enhancement scaling layer, the coded enhancement scaling layer comprising coded signalization information associated with the first block, wherein any enhancement motion data for the first block is not contained in the coded enhancement scaling layer, the coded enhancement scaling layer further comprising, in addition to the coded signalization information associated with the second block, coded enhancement motion data for the second block.

2. The apparatus according to claim 1, wherein the base motion compensator is formed to calculate the base motion data for pictures having a lower spatial resolution than the pictures based on which the enhancement motion compensator determines the enhancement motion data,
wherein further an upsampler is provided to scale the base motion data according to a difference of the spatial resolution of the group of pictures, and
wherein the enhancement motion compensator is formed to calculate the enhancement motion data based on the scaled base motion data.

3. The apparatus according to claim 2, wherein the enhancement motion compensator is formed to take over the scaled base motion data for a block as enhancement motion data, and to supply a takeover signal to the enhancement picture coder for this block.

4. The apparatus according to claim 2, wherein the enhancement motion compensator is formed to use the scaled base motion data as predictor for a block of enhancement motion data to calculate an enhancement motion data residual signal and to supply the enhancement motion data residual signal together with a prediction signalization to the enhancement picture coder.

5. The apparatus according to claim 1, wherein the base picture coder is formed to quantize with a base quantization parameter, wherein the base motion compensator is formed to calculate the base motion data depending on a base control parameter which depends the base quantization parameter,
wherein the enhancement picture coder is formed to quantize with an enhancement quantization parameter, and
wherein the enhancement motion compensator is formed to calculate the enhancement motion data in dependence on an enhancement control parameter, which depends on the enhancement quantization parameter and differs from the base control parameter.

6. The apparatus according to claim 5, wherein the enhancement motion compensator is formed to use the base motion data as predictor for the enhancement motion data and to supply an enhancement motion data residual signal with a block by block signalization to the enhancement picture coder.

7. The apparatus according to claim 5, wherein the enhancement motion compensator is formed to perform a search among a number of potential motion vectors in the determination of a motion vector for a macroblock of an enhancement layer picture according to a search criterion, wherein the enhancement motion compensator is formed to use a motion vector already determined for a macroblock of a base layer picture corresponding to the macroblock of the enhancement layer picture in the search, and when the search criterion is fulfilled by the motion vector already determined for the macroblock of the base layer picture, to take over the motion vector of the base layer and to supply information regarding the take over to the enhancement picture coder.

8. The apparatus according to claim 5, wherein the enhancement motion compensator is further formed to also consider an incrementally altered motion vector of the base layer incrementally altered by an incremental change, and when the incrementally altered motion vector of the base layer fulfills a search criterion, to supply the incremental change of the motion vector to the enhancement picture coder for a block together with a signalization for the block.

9. The apparatus according to claim 1, wherein the enhancement motion compensator is formed to determine motion vectors for blocks of a picture and to further postprocess the motion vectors to determine motion vector differences between two motion vectors and supply them to the enhancement picture coder, and
wherein the enhancement motion compensator is further formed to use, in dependence on a cost function instead of a difference between motion vectors for two blocks of the same picture, a difference between a motion vector of the block of one picture from the enhancement layer and a modified or unmodified motion vector of a corresponding block of a picture of the base layer and to supply this difference to the enhancement picture coder together with a signalization for the block.

10. The apparatus according to claim 9, wherein the enhancement motion compensator is formed to use an amount of a difference as cost function.

11. The apparatus according to claim 1, further having an intermediate layer predictor formed to calculate enhancement prediction residual error pictures by using the enhancement sequence of residual error pictures and information about the base sequence of residual error pictures.

12. The apparatus according to claim 11,
wherein the base picture coder is formed to perform quantization with a base quantization parameter,
wherein the enhancement picture coder is formed to perform quantization with an enhancement quantization parameter, wherein the enhancement quantization parameter can result in a finer quantization than the base quantization parameter,
wherein the base picture coder is formed to reconstruct the base sequence of residual error pictures quantized with the first quantization parameter to obtain a reconstructed base sequence, and
wherein the intermediate layer predictor is formed to calculate the enhancement prediction residual error pictures by using the enhancement sequence of residual error pictures and the reconstructed base sequence of residual error pictures as information about the base sequence of residual error pictures.

13. The apparatus according to claim 11, further comprising:
a decimator for decimating a resolution of a group of pictures, wherein the decimator is formed to provide a group of pictures with a base resolution to the base motion compensator, which is smaller than an enhancement resolution of a group of pictures, which is provided to the enhancement motion compensator; and
an interpolator for spatially interpolating the base sequence of residual error pictures or a reconstructed base sequence of residual error pictures to obtain an interpolated base sequence of residual error pictures, which can be supplied to the intermediate layer predictor as information about the base sequence of residual error pictures.

14. A method for generating a coded video sequence having a base scaling layer and an enhancement scaling layer, comprising the steps of:
- calculating base motion data, which indicate how a block in a current picture has moved in relation to another picture in a group of pictures;
- calculating a base sequence of residual error pictures by using the base motion data;
- performing a base picture coding to generate a coded first scaling layer from the base sequence of residual error pictures;
- determining enhancement motion data wherein the enhancement motion data are determined adaptively and block by block by using the base motion data, wherein signalization information are provided adaptively and block by block,
- wherein the signalization information indicates, for each block, whether an enhancement motion data prediction has been performed at all by using the base motion data and of what type the enhancement motion data prediction is,
- wherein the signalization information is associated to each block,
- wherein the signalization information have a first state for a first block of the coded video sequence, the signalization information having a second state for a second block of the coded video sequence, the second block being different from the first block;
- calculating an enhancement sequence of residual error pictures by using the enhancement motion data; and
- performing an enhancement picture coding by coding information about the enhancement sequence of residual error pictures and by coding the block by block signalization information to obtain a coded enhancement scaling layer,
- wherein the coded video sequence comprises the coded base scaling layer and the coded enhancement scaling layer, the coded enhancement scaling layer comprising coded signalization information associated with the first block, wherein any enhancement motion data for the first block is not contained in the coded enhancement scaling layer, the coded enhancement scaling layer further comprising, in addition to the coded signalization information associated with the second block, coded enhancement motion data for the second block.

15. A non-transitory computer readable medium having stored thereon a computer program for performing a method for generating a coded video sequence having a base scaling layer and an enhancement scaling layer, comprising the steps of:
- calculating base motion data, which indicate how a block in a current picture has moved in relation to another picture in a group of pictures;
- calculating a base sequence of residual error pictures by using the base motion data;
- performing a base picture coding to generate a coded first scaling layer from the base sequence of residual error pictures;
- determining enhancement motion data wherein enhancement motion data are determined adaptively and block by block by using the base motion data, and wherein signalization information are provided adaptively and block by block, wherein the signalization information indicates, for each block, whether an enhancement motion data prediction has been performed at all by using the base motion data and of what type the enhancement motion data prediction is, and wherein the signalization information is associated to each block,
- wherein the signalization information have a first state for a first block of the coded video sequence, the signalization information having a second state for a second block of the coded video sequence, the second block being different from the first block;
- calculating an enhancement sequence of residual error pictures by using the enhancement motion data; and
- performing an enhancement picture coding by coding information about the enhancement sequence of residual error pictures and by coding the block by block signalization information to obtain a coded enhancement scaling layer,
- wherein the coded video sequence comprises the coded base scaling layer and the coded enhancement scaling layer, the coded enhancement scaling layer comprising coded signalization information associated with the first block, wherein any enhancement motion data for the first block is not contained in the coded enhancement scaling layer, the coded enhancement scaling layer further comprising, in addition to the coded signalization information associated with the second block, coded enhancement motion data for the second block, when the method runs on a computer.

* * * * *

UNITED STATES PATENT AND TRADEMARK OFFICE
CERTIFICATE OF CORRECTION

PATENT NO. : 8,867,619 B2  
APPLICATION NO. : 12/910073  
DATED : October 21, 2014  
INVENTOR(S) : Heiko Schwarz, Detlev Marpe and Thomas Wiegand Page 1 of 1

It is certified that error appears in the above-identified patent and that said Letters Patent is hereby corrected as shown below:

Title page, item (73) Assignee: "Fraunhofer-Gesellschaft zur Foerderung der Angewandten Forschung E.V." should read -- Fraunhofer-Gesellschaft zur Foerderung der angewandten Forschung e.V. --.

Signed and Sealed this  
Sixteenth Day of August, 2016

Michelle K. Lee  
*Director of the United States Patent and Trademark Office*